(12) United States Patent
Miyake et al.

(10) Patent No.: US 8,620,708 B2
(45) Date of Patent: Dec. 31, 2013

(54) PROGRESS STATUS MANAGEMENT METHOD, PROGRAM, AND PROGRESS STATUS MANAGEMENT DEVICE

(75) Inventors: Toshiyuki Miyake, Hitachi (JP); Hisanori Nonaka, Tokai (JP); Kenji Araki, Mito (JP); Kenji Akagi, Hitachi (JP); Masatoshi Takada, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 686 days.

(21) Appl. No.: 12/267,684

(22) Filed: Nov. 10, 2008

(65) Prior Publication Data

US 2009/0125352 A1 May 14, 2009

(30) Foreign Application Priority Data

Nov. 9, 2007 (JP) .................................. 2007-292065
Sep. 25, 2008 (JP) .................................. 2008-245112

(51) Int. Cl.
*G06Q 10/00* (2012.01)
*G06Q 10/06* (2012.01)

(52) U.S. Cl.
CPC .............................. *G06Q 10/063114* (2013.01)
USPC ........................................ 705/7.15; 345/419

(58) Field of Classification Search
CPC .............................................. G06Q 10/063114
USPC .................... 705/7, 8, 7.15; 345/419
See application file for complete search history.

(56) References Cited

U.S. PATENT DOCUMENTS

| | | | |
|---|---|---|---|
| 2004/0098292 A1* | 5/2004 | Miller et al. | 705/8 |
| 2006/0044307 A1* | 3/2006 | Song | 705/8 |
| 2008/0195434 A1* | 8/2008 | Broughton | 705/7 |

FOREIGN PATENT DOCUMENTS

| | | |
|---|---|---|
| JP | 07-244686 | 9/1995 |
| JP | 08-137930 | 5/1996 |
| JP | 08-278995 | 10/1996 |
| JP | 2001-249985 | 9/2001 |
| JP | 2001-297116 | 10/2001 |
| JP | 2002-073708 | 3/2002 |
| JP | 2002-373189 | 12/2002 |
| JP | 2004-240486 | 8/2004 |
| JP | 2004-272347 | 9/2004 |
| JP | 2005-242531 | 9/2005 |
| JP | 2007-058441 | 3/2007 |

OTHER PUBLICATIONS

JP Office Action for Japanese Application Mo. 2007-292065, issued on Nov. 27, 2012.

* cited by examiner

*Primary Examiner* — F. Ryan Zeender
*Assistant Examiner* — Hunter Wilder
(74) *Attorney, Agent, or Firm* — Antonelli, Terry, Stout & Kraus, LLP.

(57) ABSTRACT

A progress status management device and a method for managing a progress status are provided so that a progress status of respective processes in a project is visually and swiftly confirmed. By using the device and method, it is possible to prevent a delay of the project progress because the processing states of processes at an optional stage of the project are shared and easily grasped by managers and workers among departments and outside business partners in charge of the project.

12 Claims, 22 Drawing Sheets

FIG.2A

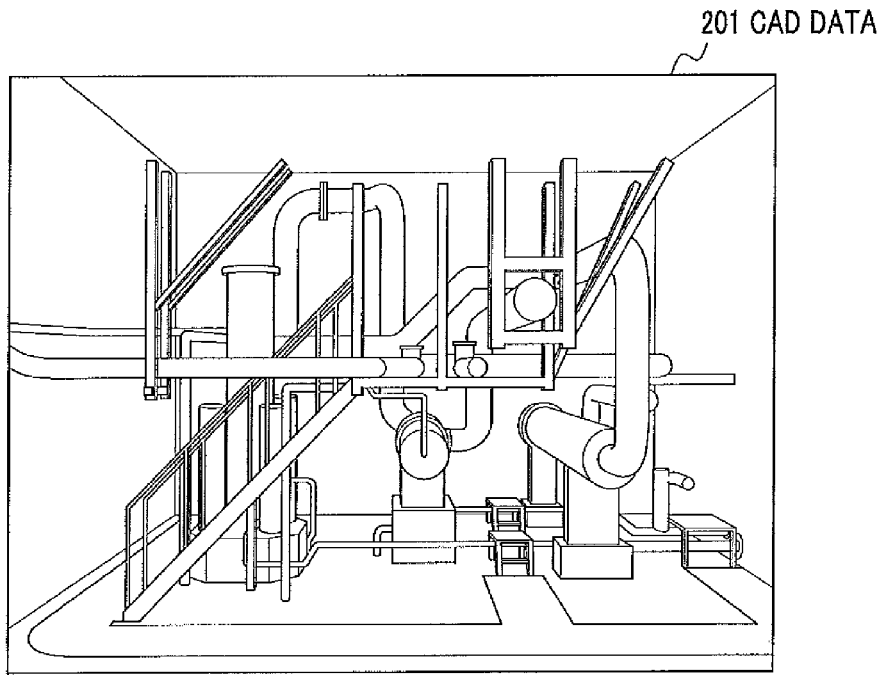

201 CAD DATA

FIG.2B

202 DESIGN PROPERTY DATA

| MODEL ID | POSITION NAME | LATEST FLAG | HISTORY PROPERTY | PRODUCT PROPERTY | | | | | | |
|---|---|---|---|---|---|---|---|---|---|---|
| | | | | TYPE | SHAPE | NOMINAL DIAMETER | THICKNESS | NODES NUMBER | LENGTH | ... |
| L0001 | PIPE LINE 1 | 1 | Rev1 | LARGE | STRAIGHT PIPE | 500 | 3 | 4 | 3.5 | ... |
| L0002 | PIPE LINE 2 | 1 | Rev2 | LARGE | CURVED PIPE | 600 | 3 | 6 | 6.0 | ... |
| L0003 | PIPE LINE 3 | 1 | Rev1 | LARGE | STRAIGHT PIPE | 650 | 3 | 3 | 5.5 | ... |
| L0004 | PIPE LINE 4 | 0 | Rev3 | LARGE | STRAIGHT PIPE | 800 | 3 | 2 | 4.5 | ... |
| L0005 | PIPE LINE 5 | 1 | Rev1 | SMALL | CURVED PIPE | 60 | 0.5 | 8 | 2.0 | ... |
| L0006 | PIPE LINE 6 | 0 | Rev1 | SMALL | STRAIGHT PIPE | 50 | 0.5 | 10 | 3.0 | ... |
| L0007 | PIPE LINE 7 | 1 | Rev1 | SMALL | CURVED PIPE | 45 | 0.5 | 4 | 4.0 | ... |
| ... | ... | ... | ... | ... | ... | ... | ... | ... | ... | ... |

FIG.3

| MODEL ID | POSITION NAME | HISTORY CHANGE PROPERTY | PROCESS A | PROCESS B | PROCESS C | PROCESS D | PROCESS E | PROCESS F | PROCESS G | PROCESS H | ... |
|---|---|---|---|---|---|---|---|---|---|---|---|
| L0001 | PIPE LINE 1 | 0 | COM | COM | COM | 90 | BEI | BEI | POS | NOT | ... |
| L0002 | PIPE LINE 2 | 0 | COM | COM | COM | BEI | BEI | BEI | POS | NOT | ... |
| L0003 | PIPE LINE 3 | 0 | COM | COM | COM | BEI | BEI | BEI | POS | NOT | ... |
| L0004 | PIPE LINE 4 | 1 | COM | COM | COM | 20 | BEI | BEI | POS | NOT | ... |
| L0005 | PIPE LINE 5 | 0 | COM | COM | COM | BEI | 40 | BEI | POS | NOT | ... |
| L0006 | PIPE LINE 6 | 0 | COM | COM | COM | 80 | BEI | BEI | POS | NOT | ... |
| L0007 | PIPE LINE 7 | ... | ... | ... | ... | ... | ... | ... | ... | ... | ... |

NOT : NOT PROCESSED  BEI : BEING PROCESSED
POS : POSSIBLE TO PROCESS  COM : COMPLETED

102 STATE MANAGEMENT DATA

103 STATE-TO-STATE CONSTRAINTS DATA

|  |  |  | FOLLOWING PROCESS ID | | | | | | | | |
|---|---|---|---|---|---|---|---|---|---|---|---|
|  |  |  | STAGE I | | | STAGE II | | | STAGE III | | ... |
|  |  |  | PROCESS A | PROCESS B | PROCESS C | PROCESS D | PROCESS E | PROCESS F | PROCESS G | PROCESS H | ... |
| PRECEDING PROCESS ID | STAGE I | PROCESS A | – | 0 | 1 | 0 | 0 | 0 | 0 | 0 | ... |
|  |  | PROCESS B | 0 | – | 1 | 0 | 0 | 0 | 0 | 0 | ... |
|  |  | PROCESS C | 0 | 0 | – | 1 | 0 | 0 | 0 | 0 | ... |
|  | STAGE II | PROCESS D | 0 | 0 | 0 | – | 0 | 0 | 1 | 0 | ... |
|  |  | PROCESS E | 0 | 0 | 0 | 0 | – | 0 | 1 | 0 | ... |
|  |  | PROCESS F | 0 | 0 | 0 | 0 | 0 | – | 1 | 0 | ... |
|  | STAGE III | PROCESS G | 0 | 0 | 0 | 0 | 0 | 0 | – | 1 | ... |
|  |  | PROCESS H | 0 | 0 | 0 | 0 | 0 | 0 | 0 | – | ... |
|  |  | ... | ... | ... | ... | ... | ... | ... | ... | ... | ... |

701 STATE PROPERTY CHANGE LIST DATA

| MODEL ID | PROCESS ID | STATE PROPERTY |
|---|---|---|
| L0001 | PROCESS A | COMPLETED |
| L0002 | PROCESS B | BEING PROCESSED |
| L0003 | PROCESS C | POSSIBLE TO PROCESS |
| L0004 | PROCESS D | BEING PROCESSED |
| L0005 | PROCESS E | POSSIBLE TO PROCESS |
| L0006 | PROCESS F | 70% |
| L0007 | PROCESS G | COMPLETED |
| ... | ... | ... |

702 HISTORY PROPERTY CHANGE LIST DATA

| MODEL ID | HISTORY CHANGE PROPERTY |
|---|---|
| L0001 | 0 |
| L0002 | 0 |
| L0003 | 0 |
| L0004 | 0 |
| L0005 | 1 |
| L0006 | 0 |
| L0007 | 1 |
| ... | ... |

1101 DISPLAY PROPERTY DATA

| PROCESS ID | STATE PROPERTY | DISPLAY PROPERTY |
|---|---|---|
| PROCESS A | NOT PROCESSED | LIGHT BLUE |
| | POSSIBLE TO PROCESS | BROWN |
| | BEING PROCESSED | BLUE |
| | COMPLETED | PINK |
| ... | ... | ... |

1400 SCHEDULING PLAN DATA

| PROCESS ID | REQUIRED TIME | START DATE | END DATE |
|---|---|---|---|
| PROCESS A | 16 | 2007/06/27 10:20:00 | 2007/06/27 17:20:00 |
| PROCESS B | 16 | 2007/06/27 10:20:00 | 2007/06/27 17:20:00 |
| PROCESS C | 16 | 2007/07/02 10:20:00 | 2007/07/05 17:20:00 |
| PROCESS D | 48 | 2007/07/03 10:20:00 | 2007/07/09 17:20:00 |
| PROCESS E | 48 | 2007/07/03 10:20:00 | 2007/07/09 17:20:00 |
| PROCESS F | 48 | 2007/07/03 10:20:00 | 2007/07/09 17:20:00 |
| PROCESS G | 80 | 2007/07/10 10:20:00 | 2007/07/20 17:20:00 |
| PROCESS H | 24 | 2007/07/23 10:20:00 | 2007/07/26 17:20:00 |
| ... | ... | ... | ... |

FIG.22

| MODEL ID | POSITION NAME | LATEST FLAG | HISTORY PROPERTY | PRODUCT PROPERTY ||||||||
|---|---|---|---|---|---|---|---|---|---|---|---|
| | | | | TYPE | SHAPE | NOMINAL DIAMETER | THICKNESS | NODES NUMBER | LENGTH | FLOOR | AREA | ... |
| L0001 | PIPE LINE 1 | 1 | Rev1 | LARGE | STRAIGHT PIPE | 500 | 3 | 4 | 3.5 | 1 | A | ... |
| L0002 | PIPE LINE 2 | 1 | Rev2 | LARGE | CURVED PIPE | 600 | 3 | 6 | 6.0 | 1 | A | ... |
| L0003 | PIPE LINE 3 | 1 | Rev1 | LARGE | STRAIGHT PIPE | 650 | 3 | 3 | 5.5 | 1 | B | ... |
| L0004 | PIPE LINE 4 | 0 | Rev3 | LARGE | STRAIGHT PIPE | 800 | 3 | 2 | 4.5 | 1 | B | ... |
| L0005 | PIPE LINE 5 | 1 | Rev1 | SMALL | CURVED PIPE | 60 | 0.5 | 8 | 2.0 | 2 | C | ... |
| L0006 | PIPE LINE 6 | 0 | Rev1 | SMALL | STRAIGHT PIPE | 50 | 0.5 | 10 | 3.0 | 2 | C | ... |
| L0007 | PIPE LINE 7 | 1 | Rev1 | SMALL | CURVED PIPE | 45 | 0.5 | 4 | 4.0 | 2 | D | ... |
| ... | ... | ... | ... | ... | ... | ... | ... | ... | ... | ... | ... | ... |

FIG.23

| MODEL GROUP ID | POSITION NAME | HISTORY CHANGE PROPERTY | PROCESS ID |||||||| |
|---|---|---|---|---|---|---|---|---|---|---|---|
| | | | PROCESS A | PROCESS B | PROCESS C | PROCESS D | PROCESS E | PROCESS F | PROCESS G | PROCESS H | ... |
| L0001 | PIPE LINE 1 | 0 | COM | COM | COM | 90 | BEI | BEI | POS | NOT | ... |
| L0002 | PIPE LINE 2 | 0 | COM | COM | COM | BEI | BEI | BEI | POS | NOT | ... |
| L0003 | PIPE LINE 3 | 0 | COM | COM | COM | BEI | BEI | BEI | POS | NOT | ... |
| L0004 | PIPE LINE 4 | 0 | COM | COM | COM | 20 | 40 | BEI | POS | NOT | ... |
| L0005 | PIPE LINE 5 | 1 | COM | COM | COM | COM | BEI | BEI | POS | NOT | ... |
| L0006 | PIPE LINE 6 | 0 | COM | COM | COM | BEI | BEI | BEI | NOT | NOT | ... |
| G0001 | POSITION GROUP 1 | 0 | COM | COM | COM | 50 | 20 | BEI | NOT | NOT | ... |
| G0002 | POSITION GROUP 2 | 0 | COM | COM | COM | BEI | BEI | BEI | NOT | NOT | ... |
| G0003 | FEATURE GROUP 1 | 0 | COM | COM | COM | 80 | BEI | BEI | NOT | NOT | ... |
| G0004 | FEATURE GROUP 2 | 0 | ... | ... | ... | ... | ... | ... | ... | ... | ... |
| ... | | | | | | | | | | | |

NOT : NOT PROCESSED  BEI : BEING PROCESSED
POS : POSSIBLE TO PROCESS  COM : COMPLETED

PROGRESS STATUS MANAGEMENT METHOD, PROGRAM, AND PROGRESS STATUS MANAGEMENT DEVICE

BACKGROUND OF THE INVENTION

1. Field of the Invention

The present invention relates to a technology for a progress status management method, a program, and a progress status management device.

2. Description of Related Art

A display method for displaying a project plan and progress by a Gantt chart is widely used for confirming a progress state of a project management including a plant EPC (Engineering, Procurement and Construction) project by project members engaged in at an optional stage of a project.

The Gantt chart describes WBS (work breakdown structure) in which all of operations carried out in the project is developed to a hierarchical structure of a respective business unit (called as work). Herein, each of the developed terminal operations is represented by an activity, and is assigned a resource required for order constraints among the activities and execution of the activities. Then, a start date and an end date of the plan for each activity are determined. A scheduling plan for all of the operations up to completion of the project is described in a bar chart. In the Gantt chart, a result bar which is determined by the start and end date of a result is represented by a bar for each operation. Accordingly, it is possible to grasp a progress status of the project by comparing current results described by the bar with the associated plan.

Further, by using the Gantt chart, it is possible to manage a state of design data at an optional stage of the project by managing a process state in associate with a state of the design data, when the design data of a respective department is integrally managed and the design data following a design process flow is stored in a database.

Besides the above-mentioned technology, for example, a Japanese Laid-Open Patent Application No. 2001-297116 discloses an integrated designing system for a plant and an integrated management system for a plant construction project. The system manages a progress of the project by the following steps. Firstly, the system stores design information on a plant construction project supplied by a plurality of design departments together with information on a change in the design information and state information on whether or not the change information is confirmed, in a database. Then, by keeping consistency on the change of the design information among the design departments; connecting through a network; and notifying the related departments of the changed design information, the system manages a project progress.

According to the technology disclosed in a Japanese Laid-Open Patent Application No. 2001-297116, only those who are in charge and receive a notification, can notice the information on the design change because a changed part of the design is described in sentences. That is, it is difficult for supervisor superior to the person in charge and other persons concerned, to grasp an image on an actual shape of the changed target and work amount required for other changed targets.

Furthermore, according to the technology mentioned in a Japanese Laid-Open Patent Application No. 2001-297116, it is not possible to visually and swiftly confirm a change of the state that any of the process becomes ready to start at any stage of the project as soon other processes as completed which have a constraints relation. Therefore, it is probable that a delay of processes in the project may be occurred.

SUMMARY OF THE INVENTION

The present invention is developed in view of the above-mentioned background. It is an object of the present invention to provide a method and device which can visually and swiftly confirm a progress status of each process in a project.

For solving the above-mentioned problem, the present invention provides a progress status management device for managing a progress status of processes including a storage which stores, design data including a component ID for each component data, state management data associating the component ID with progress status data on a plurality of processes, and display property data storing display method data to discriminate the progress status of the processes. The progress status management device associates components data included in the design data in the storage with progress status data included in the state management data. Further, the progress status management device associates the display method data included in the display property data with the progress status data on processes which corresponds to the components data. Further, the progress status management device prepares a screen image for displaying a processing state which indicates these correspondences, and displays the screen image on a display.

According to the present invention, it is possible to visually confirm the progress status of each process in the project.

BRIEF DESCRIPTION OF THE DRAWINGS

FIG. 2 shows examples of a structure of design data of the present embodiment. FIG. 2 A shows an example of CAD data of a three dimensional CAD in a plant design drawing. FIG. 2B shows an example of design property data.

FIG. 3 is an exemplary table showing state management data of the present embodiment.

FIG. 4 A is an exemplary table showing a construction of the state-to-state constraints data. FIG. 4 B is a schematic drawing showing a relationship among processes indicated by the data in FIG. 4A.

FIG. 7 shows examples for a data table on a state property change list and data on a history property change list of the present embodiment.

FIG. 14 shows drawings showing a display method for a variety of states.

FIG. 15 shows other examples of the processing state display screen image of the present embodiment.

FIG. 22 is a table showing the design state data which manages a position name in association with an arrangement position.

FIG. 23 is a table showing an example of the management data to which a group ID is added.

DETAILED DESCRIPTION OF THE PREFERRED EMBODIMENT

Next, preferred embodiment of the present invention (the present embodiment) will be explained in detail with reference to drawings appropriately.

Figure 1:
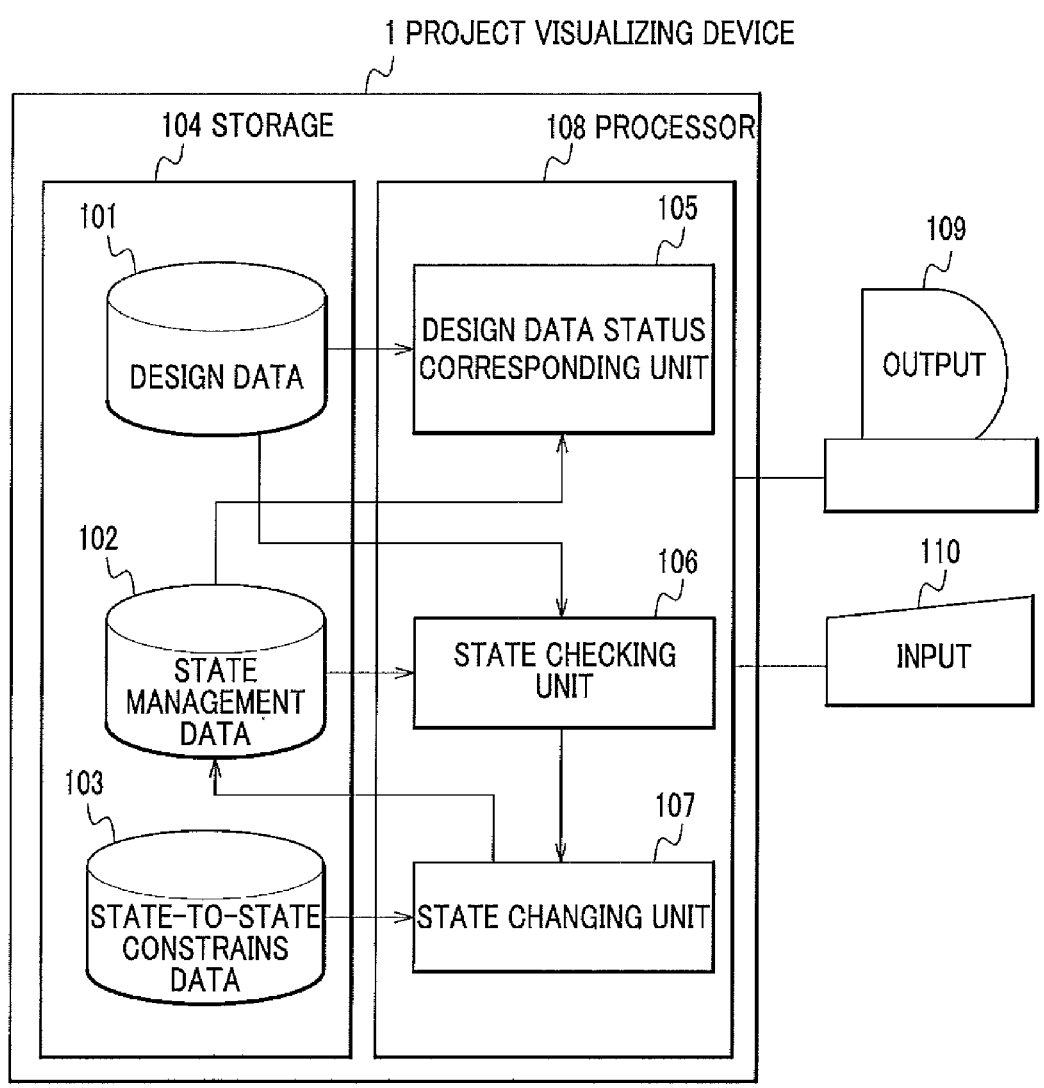
FIG. 1 is a schematic diagram showing a structure of a project visualizing device of the present embodiment.

FIG. 1 is a schematic diagram showing a structure of a project visualizing device according to the present embodiment.

The project visualizing device 1 (a progress status management device) comprises a storage 104 which stores design data 101, state management data 102 and state to state-to-state constraints data 103, and a processor 108 which includes a design data state corresponding unit (105), a state checking unit 106, and a state changing unit 107. Further, the project visualizing device 1 is connected with an output 109 (a display) and an input 110 (the storage 104).

The design data state corresponding unit 105 has a function of emphatically displaying the state management data 102 and the design data 101 in association with a progress status of processes, based on the design data 101. The state checking unit 106 has a function of checking a change of the state management data 102 and the design data 101. The state changing unit 107 has a function of determining whether or not is needed a change of a state property in the state management data 102. If the change is needed, the state changing unit 107 changes the state property in the state management data 102.

FIG. 2 shows a structure of the design data according to the present embodiment. FIG. 2A shows an example of a CAD (Computer Aided Design) data on a three dimensional CAD in a plant design drawing. FIG. 2B shows an example of design property data.

CAD data 201 (component data) is preferably three dimensional CAD data including data on a product configuration and a variety of product properties. However, the CAD data may be, for example, data on a drawing of two dimensional CAD and a constituent table for components, as long as the CAD data 202 can discriminate a product shape, a component of a respective position and a positional relation. As shown in FIG. 2A, the three dimensional CAD data 201 includes, for example, a model ID for a pipe line, a position name, a latest flag which represents information indicating whether the correspondent design data 101 is latest or not, a history property which manages a history of the design data 101, and design property data 202 including a product property which represents a product information. The product property includes a type of the product, a shape of a pipe, a nominal diameter, a wall thickness, the number of nodes, and a length. Herein, a model is associated with a respective component included in the CAD data 201.

In FIG. 2B, the latest flag is "1" for each model ID (a component ID) of the design data 101, if the design data 101 which corresponds to the model ID is the latest data. If the design data 101 is not the latest data, the latest flag is "0". Furthermore, the history property stores the number indicating the history. Here, in FIG. 2B, "Rev" shown in a column of a history property is an abbreviation of Revision, and represents a version number. "Rev n+a" indicates a newer history than "Rev n".

FIG. 3 is an exemplary table showing a structure of the state management data according to the present embodiment.

The state management data 102 is data for managing a progress status of processes corresponding to the model ID of the design data 101, which includes a model ID, a position name, a history change property and a process ID. The process ID is the number for discriminating a respective process in the project. In the present embodiment, the process ID is discriminated by the alphabet such as "process A", "process B". The state management data 102 possesses a state property 301 (data on a progress status) for each process (each process ID) corresponding to the model ID. The state property 301, for example, as shown in FIG. 3, is represented by four states such as: not processed (not), possible to process (pos), being processed (bei), and completed (com). Further, the state property 301 is represented by a more detailed description such as a percentage value for showing a processing progress in "being processed" (a numeral value in FIG. 3).

Further, the history change property shows whether a version number in the design data 101 is changed or not. If the design data 101 is changed, the numeral value is "1". If not changed, the numeral value is "0".

Figures 4A, 4B:
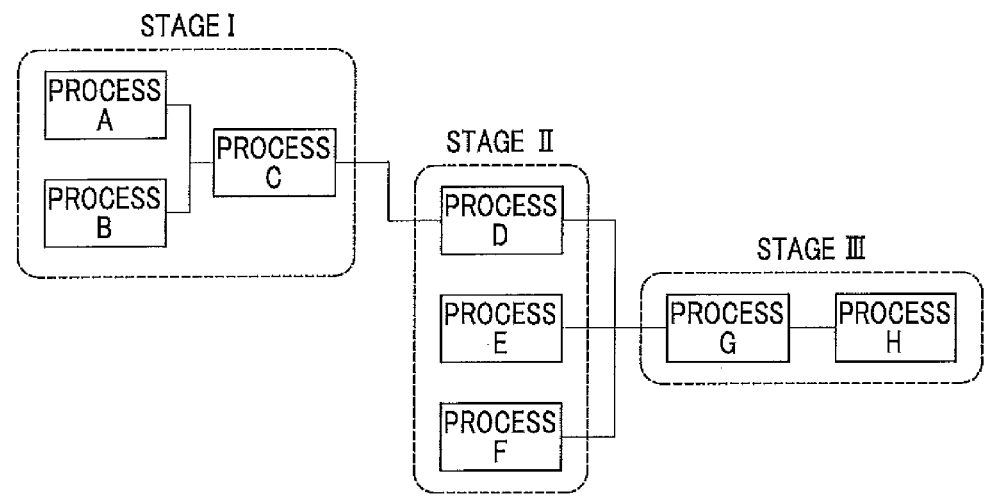
FIG. 4 shows examples of state-to-state constraints data of the present embodiment.

FIG. 4 shows examples of the state-to-state constraints data according to the present embodiment. FIG. 4A is an exemplary table showing a structure of the state-to-state constraints data. FIG. 4B is a drawing showing a relation among processes shown by the data in FIG. 4A.

As shown in FIG. 4A, the state-to-state constraints data 103 is data describing a process executive order relation among processes. Herein, a preceding process is a process which is conducted before any of the processes. A following process is a process which is conducted after any of the processes. In FIG. 4A, "0" indicates that there is no direct process order relation among the corresponding processes. "1" indicates that there is a direct relation among the corresponding processes. If the preceding process is identical with the following process (for example, if the preceding process is a "process A" and the following process is the "process A"), a code "–" and a null value are stored in the state-to-state constraints data 103.

As an example shown in FIG. 4A, a value of the preceding process ID at the "process A" and a "process B" is "1" in the case that the following process is a "process C". In other words, the following process to follow the "process A" and the "process B" is the "process C". In a similar way, the following process to follow the "process C" is a "process D". The following process to follow the "process D", a "process E" and a "process F" is a "process G". The following process to follow the "process G" is a "process H". FIG. 4B is a schematic drawing showing a process order relation among the processes shown in FIG. 4A. Here, an optional stage in the project represents a group of processes. For example, a product design stage is a stage I including the process A, the process B and the process C. A procurement stage is a stage II including the process D, the process E and the process F. A transportation stage is a stage III including the process G and the process H. Herein, the optional stage is not restricted to the above-mentioned three stages. It is allowable to add other stages such as production and construction stages besides design, procurement and transportation stages, or adopt any combination of these stages.

Next, processing steps according to the present embodiment will be explained with reference to FIGS. 5 to 11 together with FIGS. 1 to 4.

Figure 5:
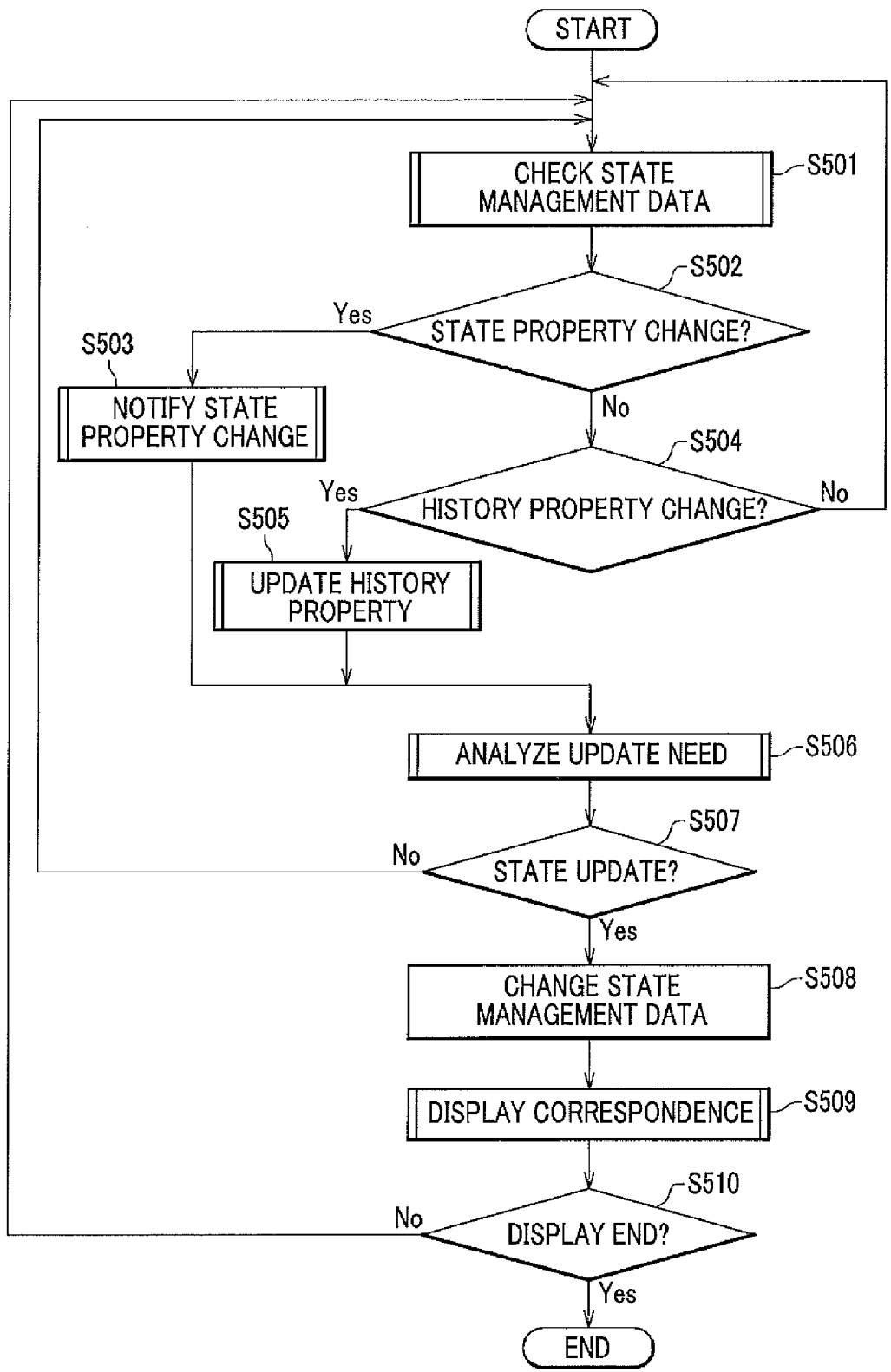
FIG. 5 is a flowchart indicating total processing of the present embodiment.

FIG. 5 is a flowchart showing a process of the entire processing of the present embodiment.

The state checking unit 106 continually checks a state property 301 of a design progress and the state management data 102 for managing a history change of the design data 101 (S501). A step S501 will be explained later with reference to FIG. 6.

The state checking unit 106 checks the state management data 102 within a predetermined period, for example, every 0.1 second.

The state checking unit 106 determines whether or not there is a change in the state property 301 in the state management data 102, based on a result in the step S501 (S502).

If there is a change in the state property 301 in the step S502 (S502→Yes), the state checking unit 106 notifies the state changing unit 107 of the change in the state (the change in the state property 301) (S503). The processor 108 forwards the processing to a step S506. The step S503 will be explained later with reference to FIG. 8.

If there is no change in the state property 301 in the step S502 (S502→No), the state checking unit 106 refers to the history property of the design data 101, and determines whether or not there is a change in the history property (S504).

If there is a change in the history property in the step S504 (S504→Yes), the state checking unit 106 updates the history property (S505). Simultaneously, the state checking unit 106 prepares history property change list data 702 combining the obtained history change property and the model ID (shown in FIG. 7B). The step S505 will be explained later with reference to FIG. 9.

If there is no change in the history property in the step S504 (S504→No), the processor 108 returns the processing to the step S501.

Next, the state changing unit 107 analyzes whether or not are needed changes in other process states for any of the processes, according to the state-to-state constraints data 103. That is, the state changing unit 107 performs the analysis according to state-to-state constraints in the state management data 102 (S506).

The step S506 will be explained later with reference to FIG. 10. The state changing unit 107 determines whether or not states of other processes should be updated (S507).

If the state changing unit 107 determines not to update the states of other processes in the process S507 (S507→No), the processor 108 returns the processing to the step S501.

If the state changing unit 107 determines to update the states of other processes in the step S507 (S507→Yes), the state changing unit 107 updates the state property 301 of the process corresponding to the state change, in the state management data 102.

Next, the design data state corresponding unit 105 reads the state property 301 from the state management data 102, associates the read state property 301 with the model ID of the design data 101, and displays the state property 301 with the model ID on the output 109 (S509). The step S509 will be explained later with reference to FIG. 11.

Next, the processor 108 displays a screen image on the display 109 indicating to a user whether or not the display should be ended. Then, the processor 108 determines whether or not to end the display, based on the information input by the user using the input 110 (S510).

If the processor 108 determines to end the display in the step S510 (S510→Yes), the processor 108 ends the display of the design data 101 and completes the processing.

If the processor 108 determines not to end the display in the step S510 (S510→No), the processor 108 returns the processing to the step S501.

Figure 6:
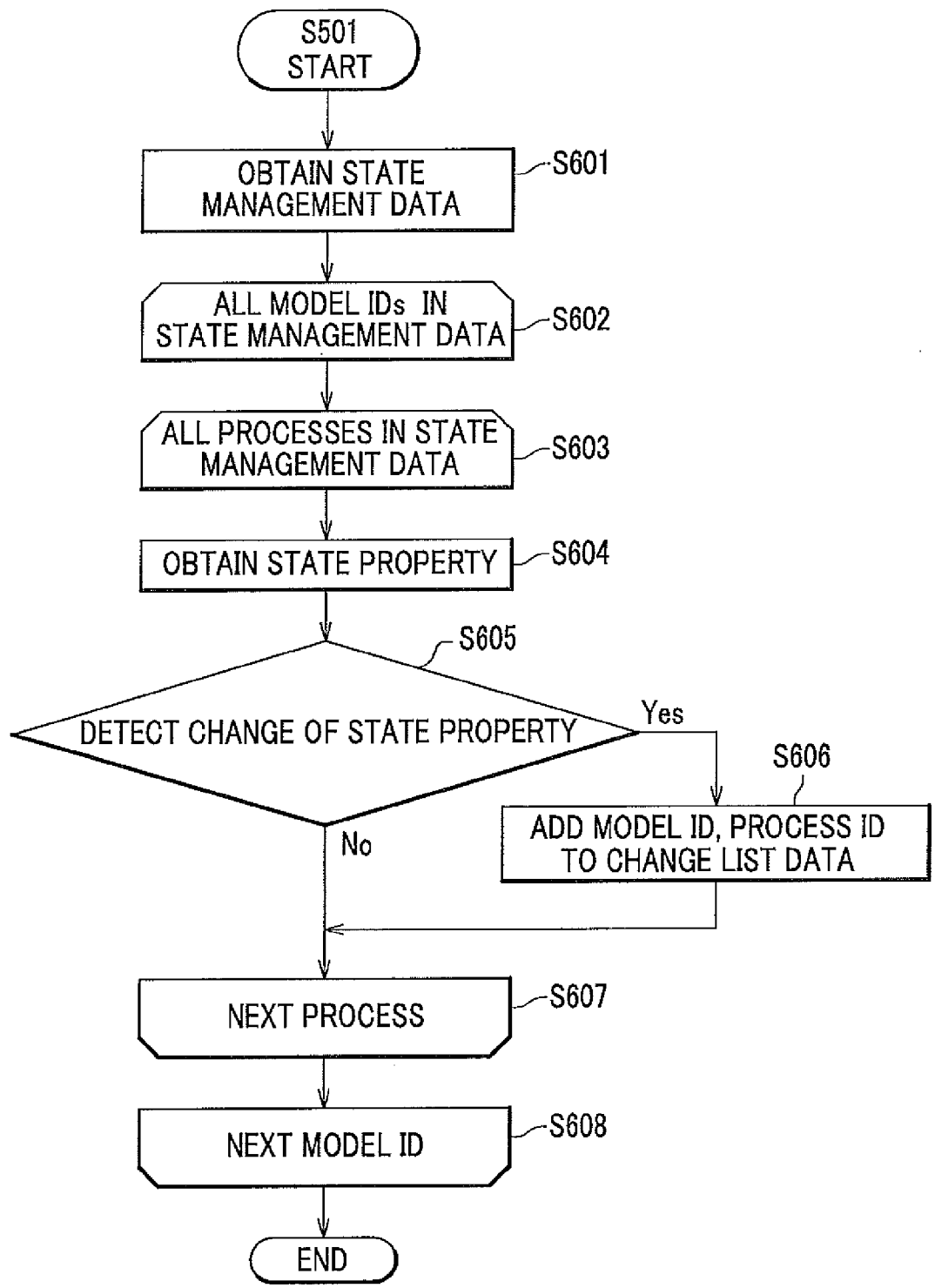
FIG. 6 is a flowchart indicating checking processing for state management data in FIG. 5.

FIG. 6 is a flowchart showing checking processing by the state management data in FIG. 5.

FIG. 6 shows checking processing in the step S501 in FIG. 5.

Firstly, the state checking unit 106 obtains the state management data 102 from the storage 104 (S601).

Then, the state checking unit 106 conducts the following processing for all the model IDs (S602) and all the processes (S603) in the state management data 102 obtained.

Firstly, the state checking unit 106 obtains the state property 301 from the obtained state management data 102 (S604). Then, the state checking unit 106 determines whether or not a change in the obtained state property 301 is detected (S605).

If the change in the state property 301 is not detected in the step S605 (S605→No), the state checking unit 106 forwards the processing to the step S607.

If the change in the state property 301 is detected in the step S605 (S605→Yes), the state checking unit 106 adds the model ID, the process ID and the state property 301 on which the change is detected in the state management data 102, to the state property change list data 701 which will be explained later with reference to FIG. 7A (S606). Next, the state checking unit 106 repeats the processing from the step S604 to the step S606 for the next process (S607). When the state checking unit 106 completes the processing for all the processes, the state checking unit 106 repeats the processing from the step S603 to the step S607 for the next model ID (S608).

Figure 7A:
FIG. 7A is an example of the data on a state property change list.
Figure 7B:
FIG. 7B is an example of the data on a history property change list.

FIG. 7 shows examples of a structure of the state property change list data 701 and the history property change list data 702 according to the present embodiment. FIG. 7A is an example of the state property change list data 701. FIG. 7B is an example of the history property change list data 702.

The state property change list data 701 is created at a stage of the step S606 indicated in FIG. 6, and includes and stores the model ID, process ID and the state property which are associated with one another as shown in FIG. 7A. The state property change list data 701 is a list of model IDs whose state property 301 has been changed in the state management data 102 and the process ID whose state property 301 has been changed in the state management data 102.

The state property is represented by four states such as: not processed (not), possible to process (pos), being processed (bei), and completed (com) similar to the state management data 102 (refer to FIG. 3). Besides the four representatives above mentioned, the state property may be represented by a more detailed description such as a percentage value for showing a processing progress in "being processed".

The history property change list data 702 is created at the stage of the step S505 in FIG. 5. Herein, the model ID and the property for a history change are described as a pair of information. The history property change list data 702 is a list of model IDs whose history has been changed in the design data 101.

Figure 8:
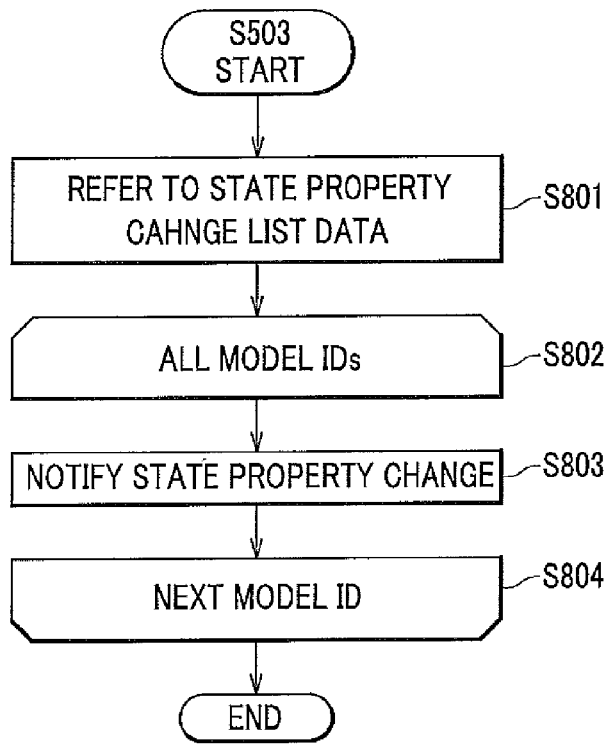
FIG. 8 is a flowchart showing notification processing for a state property change in FIG. 5.

FIG. 8 is a flowchart showing notification processing for a state change in FIG. 5.

FIG. 8 shows notification processing shown in the step S503 in FIG. 5.

Firstly, the state checking unit 106 refers to the state property change list data 701 shown in FIG. 7A (S801).

Then, the state checking unit 106 notifies the state changing unit 107 of all changes in a state property of the model IDs and process IDs (S803) with respect to all the model IDs in the state property change list data 701 (S802). Next, the state checking unit 106 repeats the processing in the step S803 for the next model ID (S804).

Figure 9:
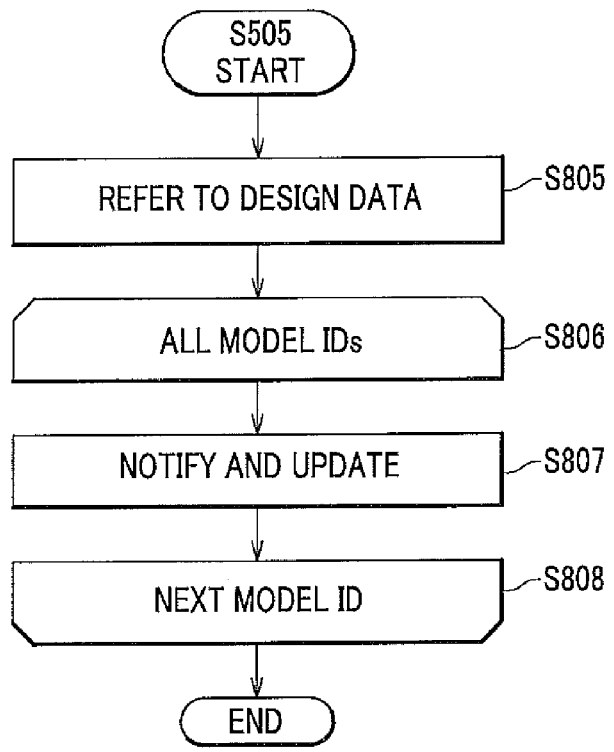
FIG. 9 is a flowchart showing update processing of a history property in FIG. 5.

FIG. 9 is a flowchart showing update processing for the history property in FIG. 5.

FIG. 9 shows update processing in the step S505 indicated in FIG. 5.

Firstly, the state checking unit 106 refers to the design property data 202 in the design data 101 (S805).

Then, the state checking unit 106 sends to the state changing unit 107 a notification of all changes in the state property of the history property. The notification includes information on whether there is a change of the model ID and history property. The state changing unit 107 updates the history property in the state management data 102 by using the model ID as a key in the notification of the change in the state property (S807). Next, the state changing unit 106 repeats the processing in the step S807 for the next model ID (S808). After the operation, the state checking unit 106 outputs the history change property and the model ID which is sent to the state changing unit 107, to the history property change list data 702 in a list format shown in FIG. 7B.

Figure 10:
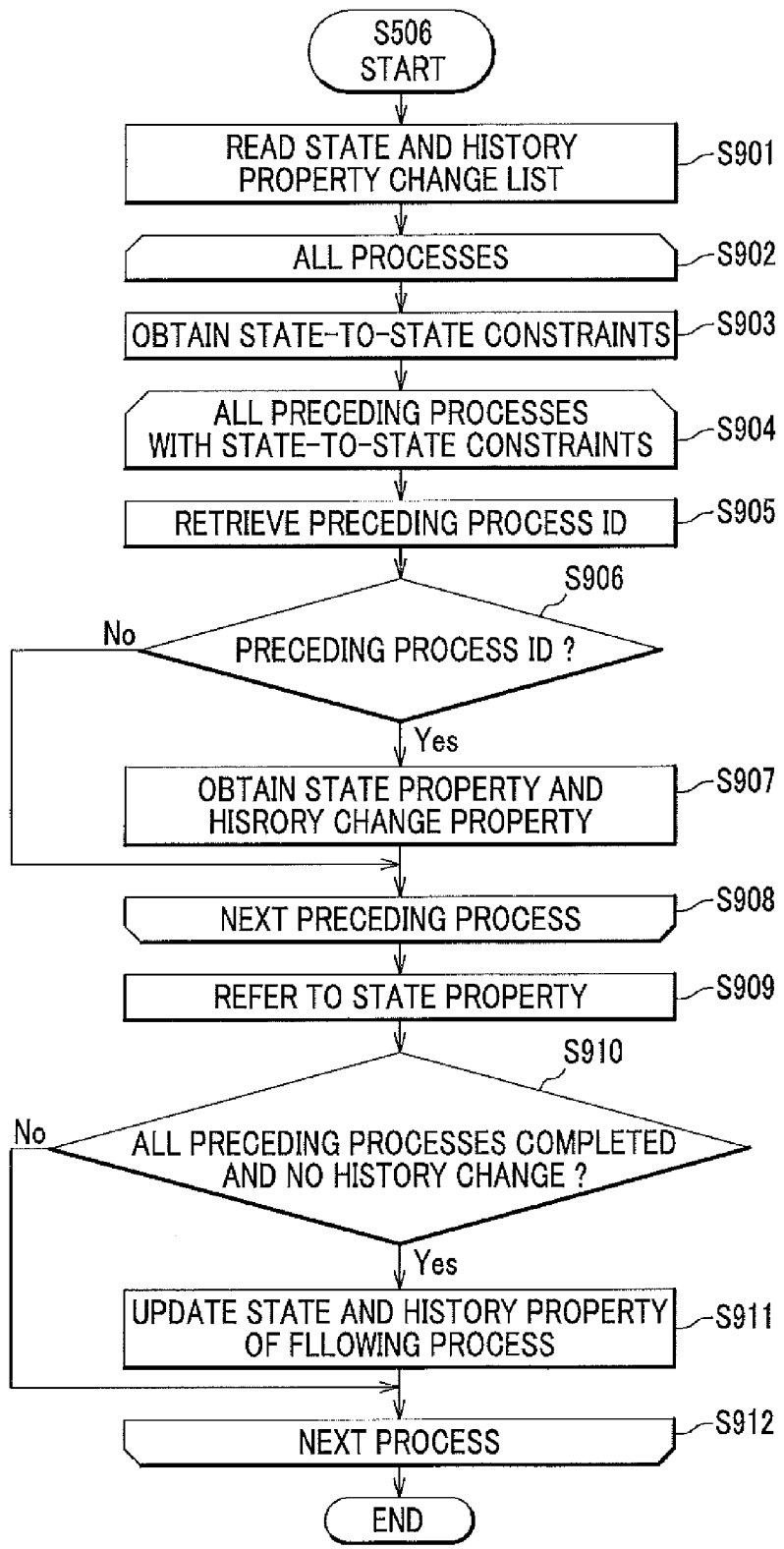
FIG. 10 is a flowchart showing analytical processing based on state-to-state constraints in the state management data in FIG. 5.

FIG. 10 is a flowchart showing analytical processing of the state management data based on the state-to-state constraints in FIG. 5.

FIG. 10 shows analytical processing in the step S506 in FIG. 5.

Firstly, the state changing unit 107 reads a change list of the state property (the state property change list data 701 in FIG. 7A) and a change list of a history property (the history property change list data 702 in FIG. 7B) (S901).

Then, the state changing unit 107 executes the following processing in all the processes (S902). Here, the state changing unit 107 executes the processing from a following process. That is, as exemplified in FIG. 4B, the state changing unit 107 executes the processing in order of the process H, process G, process F, process E, process D, . . . , process A.

The state changing unit 107 obtains the constraint condition with reference to the state-to-state constraints data 103 (S903). The state changing unit 107 obtains all the process IDs of preceding processes (the preceding process ID) which have a constraint relation with the target processing processes, from the state-to-state constraints data 103. As exemplified in FIG. 4, preceding processes of the process H are the process G, process F, . . . , process B, and process A. Preceding processes of the process D are the process C, process B, and process A. There is no preceding process before the process F and process E. Further, with respect to all the preceding processes in which a constraint relation is recognized in a step S903, (S904), the state changing unit 107 retrieves the process ID possessing the corresponding preceding process ID in the state property change list (the state property change list data in FIG. 7A) (S905). Further, the state changing unit 107 determines whether or not there is a preceding process being a processing target (S906).

That is, if a processing target process is a following process in the state-to-state constraints data 103, the state changing unit 107 determines whether or not there is a process of which state property 301 changes among the preceding processes in which the constraint relation exists, by determining whether or not there is a preceding process having a value of "1".

If there is no preceding process in the step S906 (S906→No), the state changing unit 107 forwards the processing to a step S908.

If there is a preceding process in the step S906 (S906→Yes), the state changing unit 107 obtains the state property and the history change property for the corresponding preceding process ID, from the state property change list data 701 (refer to FIG. 7A) and the history property change list data 702 (refer to FIG. 7 B) (S907).

Furthermore, the state changing unit 107 repeats the processing from the step S905 to the step S907 for the next preceding process in which a constraints relation exists in the step S903 (S908).

Next, the state changing unit 107 refers to the state property 301 in the state management data 102 for all the preceding processes having a constraints relation with the processing target processes (S909). Further, the state changing unit 107 refers to the history property change list data 702 (see FIG. 7B). The state changing unit 107 determines whether or not all of the referred preceding processes are completed and there is no history change (S910).

If the preceding processes are not ended completely, or if there is a history change in the step S910 (S910→No), the state changing unit 107 forwards the processing to a step S912.

If the preceding processes are completely ended and there is no history change in the step S910 (S910→Yes), the state changing unit 107 updates the state property 301 and the history change property in the state management data 102 of the following processes being a processing target, in the state management data 102 (S911). Then, the state changing unit 107 repeats the processing from the step S903 to the step S911 for the next process (S912).

Figure 11:
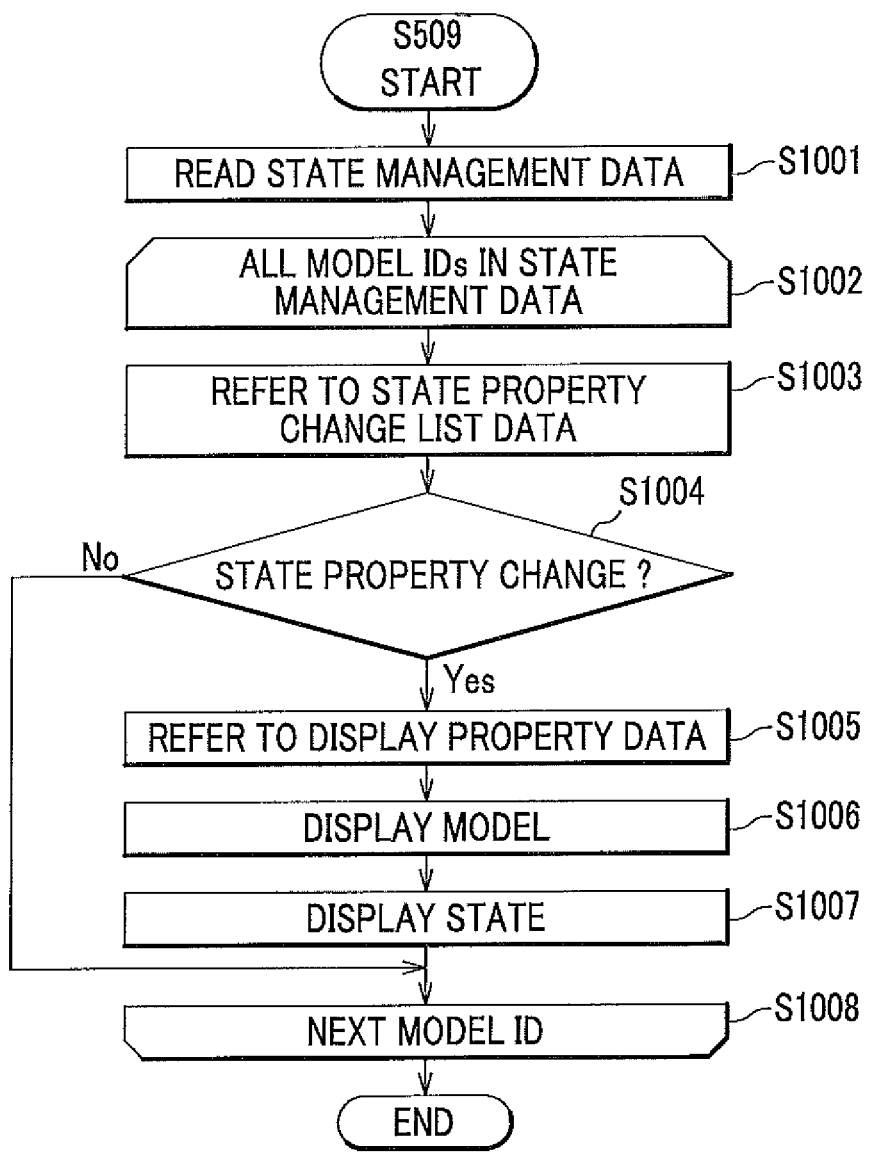
FIG. 11 is a flowchart showing display processing which associates the design data with the state property in FIG. 5.

FIG. 11 is a flowchart showing display processing displaying the design data 101 and the state property 301 which are associated with each other as is done in FIG. 5.

FIG. 11 shows display processing in the step S509 in FIG. 5.

In FIG. 11, a correspondence between the design data 101 and the state property 301 is already displayed. FIG. 11 describes a method for changing a part of the display image for the design data 101 in which there is a change in the state property in the sate management data 102.

Firstly, the design data state corresponding unit 105 reads the state management data 102 from the storage 104 (S1001).

Next, the design data state corresponding unit 105 executes the following processing for all the model IDs in the state management data 102 (S1002).

Firstly, the design data state corresponding unit 105 refers to the state property change list data 701 (see FIG. 7A) by using the model ID as a key; the model ID being the processing target (S1003), and determines whether or not there is a change in the state property of the model ID being the processing target (S1004).

If there is no change in the state property in the step S1004 (S1004→No), the design data state corresponding unit 105 forwards the processing to a step S1008.

If there is a change for the state property in the step S1004 (S1004→Yes), the design data state corresponding unit 105 refers to display property data 1101 which is mentioned later with reference to FIG. 12 (S1005). That is, the design data state corresponding unit 105 obtains the process ID in the state property change list data 701 and the state property corresponding to the process ID, by using the model ID as a key which is a processing target.

Further, the design data state corresponding unit 105 obtains a display property (data on a display method) from the display property data 1101 by using the obtained state property as a key. Then, the design data state responding unit 105 displays a model corresponding to the model ID which is a processing target, on the output 109 (S1006). Next, the design data state corresponding unit 105 displays the state of the model on the output 109 based on the obtained display property (S1007). Further, the design data state corresponding unit 105 repeats the processing from the step S1003 to the steps S1007 for the next model ID (S1008).

Here, the design data state corresponding unit 105 displays a model for which the state property changes. In the case of a first processing, the design data state corresponding unit 105 displays all the models which are a state display target, by assigning the state property and the display property to respective models.

Figures 12, 13:
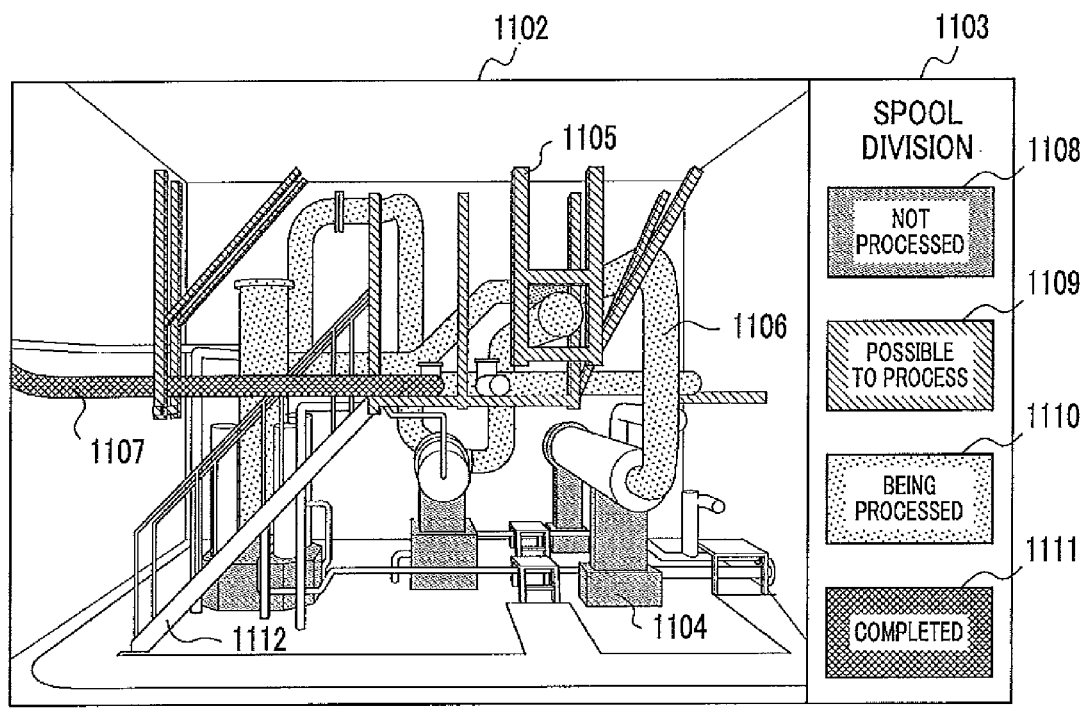
FIG. 12 is a table showing an example of display property data of the present embodiment.
FIG. 13 is a drawing showing an example of a processing state display screen image of the present embodiment.

FIG. 12 is a table showing the display property data according to the present embodiment.

As shown in FIG. 12, the display property data 1101 describes a display property (display method data) for a process ID as a state property display method. In a process A, a component in a state of "not processed" is displayed in "light blue", a component in a state of "possible to process" is displayed in "brown", a component in a state of "being processed" is displayed in "blue", and a component in a state of "completed" is displayed in "pink".

FIG. 13 is an example of a screen image for displaying a process state according to the present embodiment.

In FIG. 13, the process state is displayed according to the display property data shown in FIG. 12. Here, a difference in color is distinguished by hatching.

The process state displaying a screen image includes a design data display screen image 1102 and an example display screen image 1103. FIG. 13 shows an example of a process state display screen image adopting "spool division" as a process corresponding to the process A in FIG. 12.

In the design data display screen image 1102, a component in a state of "not processed" such as a code 1104 is colored in the same color as an example 1108. A component in a state of "possible to process" such as a code 1105 is colored in the same color as an example 1109. A component in a state of "being processed" such as a code 1106 is colored in the same color as an example 1110. A component in a state of "completed" such as a code 1107 is colored in the same color as an example 1111. Here, in the design data display screen image 1102, a component which is not included in spool division is not colored (for example, a code 1102).

A display property of the display property data (refer to FIG. 12) can be defined so that a three dimensional CAD object being a non-target for a display (for example, a component which is not included in spool division in FIG. 13) is displayed in wire frames or broken lines. Further, the display property of the display property data can be defined so that a hatching pattern and three dimensional notes are laid out for a three dimensional CAD object being a target or a non-target for a display. Or, the display property of the display property data can be defined so that no states except for the specific state are displayed, for example, as only a component of "not processes" is displayed and other components are not displayed.

Here, the example display screen image 1103 can be omitted.

Figure 14A:
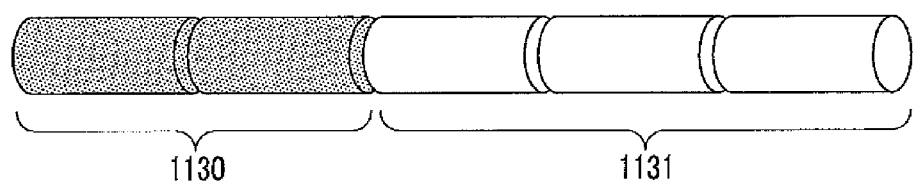
FIG. 14A is an example of displaying an object in a transparent color.
Figure 14B:
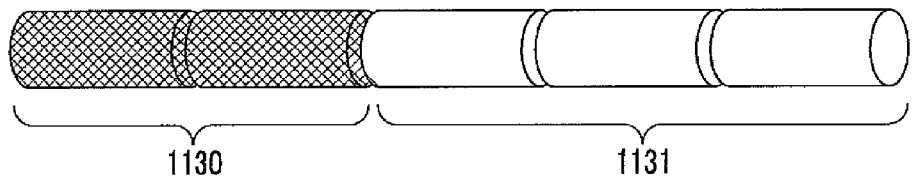
FIG. 14B is an example of displaying an object by a hatching pattern.
Figure 14C:
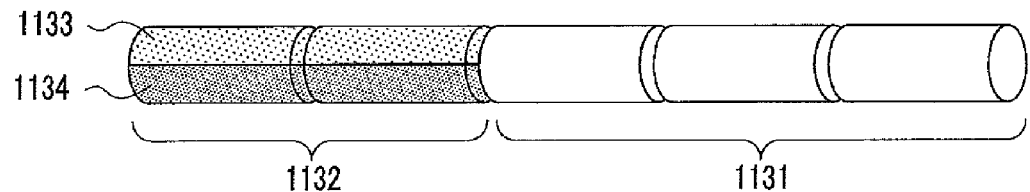
FIG. 14C is an example of displaying an object in the case that a plurality of states overlap in the same part.

FIG. 14 shows a method for displaying a variety of states. FIG. 14A is an example for showing a state in a transparent color. FIG. 14B is an example for showing a state in a hatching pattern. FIG. 14C is an example for showing a state in which a plurality of states are overlapped in the same component.

In FIG. 14A and FIG. 14B, a code 1130 indicates a part for which division of a piping spool is completed, and a code 1140 indicates a part where division of a piping spool is not completed. In the present embodiment, the state property of the process is distinguished in color of a non-transparent color as shown in FIG. 13.

As shown in FIG. 14A, the state property of the process is represented by a transparent color (in FIG. 14A, represented by hatching), or is represented by hatching as shown in FIG. 14B.

Further, as indicated by a code 1132, if a plurality of states exist in an identical part, such as a state in which a piping spool is completed and a state in which a drawing for piping is completed, the same part can be colored in a plurality of colors as indicated in a code 1133 and a code 1134. Here, the code 1131 in FIG. 14C will not be explained because it is the same as the code 1131 in FIG. 14A and FIG. 14B.

Here, a user may specify a model of the design data of which progress state the user wants to confirm through the input, in order to know the progress status including a state which has a constraint relation for an optional process at an optional stage in the project. That is, as shown in FIG. 13, all the states for all the models selected as a display target are not displayed. Only a state of the model specified by the user is displayed. Further, for the specified model, it is possible to retrieve the state property 301 of the process having a constraint relation based on the state-to-state constraints data 103. Then, the model of the corresponding process and design data 101 can be displayed on the output 109 together with the state property 301 of the process. Therefore, it is possible to display the states of the designated model and the model which is relevant to a process preceding to or following the designated model.

Further, relations on the order of processes at an optional stage in the project in the state-to-state constraints data and correspondence on the information of the attached working instructions and the relevant documents referred to, can be edited by the input 110. The information on the attached working instructions and the relevant documents referred to is stored in the storage 104 in association with the model ID unit and process ID unit of the design data 101.

Further, the display property data 1101 shown in FIG. 12 can be edited by the input 110. Herein, the display property may be represented selectively by transparency, hatching, and display/non-display besides color.

Figure 15A:
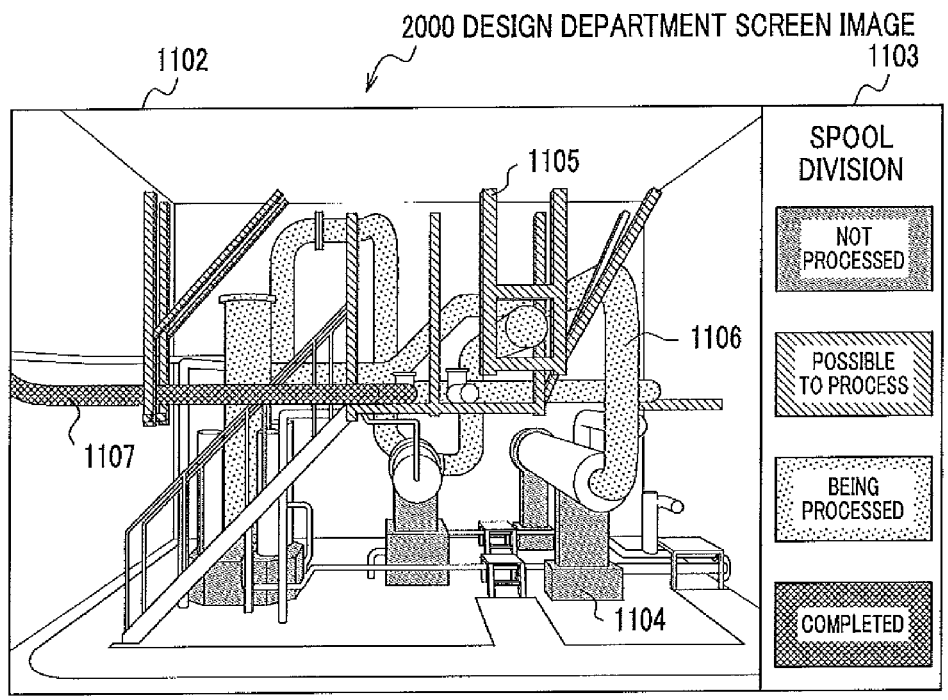
FIG. 15A is an example of the progress status display image in a design department (a design department screen image).
Figure 15B:
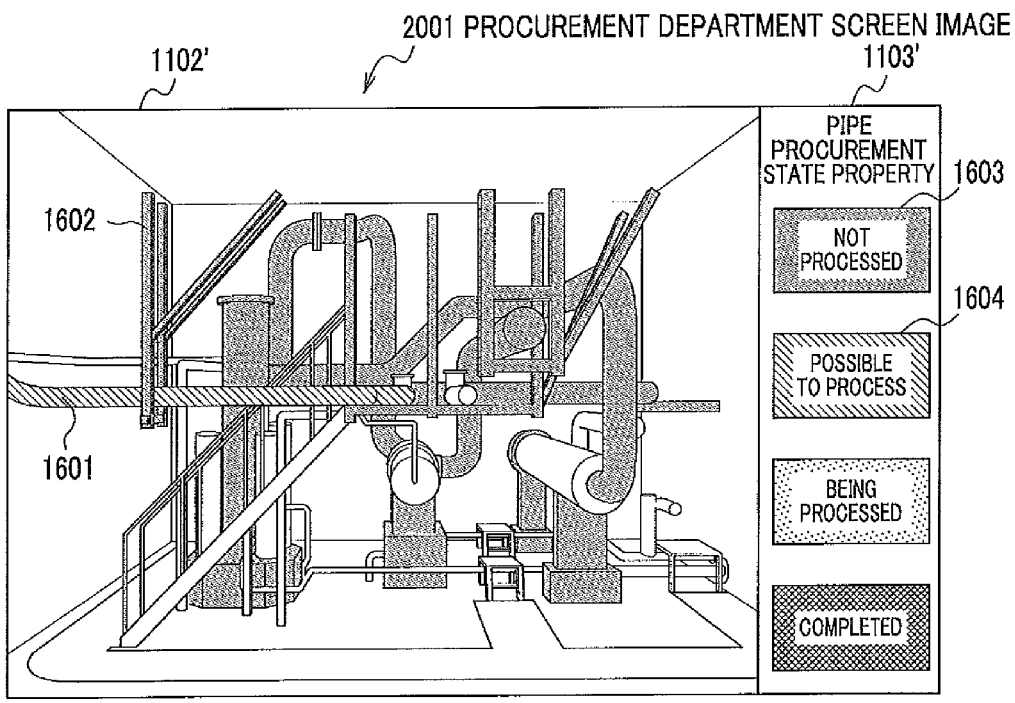
FIG. 15B is an example of the processing state display image in a procurement department (a procurement department screen image).

FIG. 15 shows other examples for the processing state display screen image according to the present embodiment. FIG. 15A indicates an example of the processing state display screen image in a design department (a screen image for the design department). FIG. 15B indicates an example of the processing state displaying a screen image in a procurement department (a screen image for the procurement department).

Both the screen images for a design department 2000 and for a procurement department 2001 possess the design data displaying a screen image 1102 and 1102' and the example displaying a screen image 1103 and 1103'.

Here, the screen image for the design department shown in FIG. 15A will not be explained because it is the same as the screen image for displaying a state property shown in FIG. 13. The same codes as FIG. 13 are used in FIG. 15A. Since the parts which become "completed" in the design department become "possible to process" in the procurement department, a part 1107 shown as "completed" in FIG. 15A becomes a part 1601 shown as "possible to process" in FIG. 15 B. Further, parts 1104 to 1106 in FIG. 15A are a part 1602 shown as "not processed" in FIG. 15B.

Here, it is assumed that the design department screen image 2000 in FIG. 15 A is a screen image displayed on the output 109 arranged in the design department (refer to FIG. 1). The procurement department screen image 2001 in FIG. 15B is a screen image displayed on the output 109 arranged in the procurement department. However, it is not restricted to the above-mentioned examples. For example, the screen images shown in FIG. 15A and FIG. 15B can be changed by pushing a button for changing a screen image not shown, by the input 110 (refer to FIG. 1).

According to the embodiment mentioned above, it is possible to more easily communicate information on the progress status among the departments, and to prevent a delay of the project progress.

Next, a method for additionally displaying information, on a scheduling plan will be explained according to FIG. 16 and FIG. 17.

Figure 16:
FIG. 16 is a table showing scheduling plan data on the processes of the present embodiment.

FIG. 16 is a table showing process scheduling plan data according to the present embodiment.

The storage 104 (refer to FIG. 1) may store scheduling plan data 1400 as shown in FIG. 16.

The scheduling plan data includes a time required for a process, a start time and date, and an end time and date as shown in FIG. 16. By using the scheduling plan data 1400, it is possible to make a plan on all the processes in the project with reference to time. When making the plan, the start date and the end date of each process can be automatically determined by making a scheduling plan automatically in the order from the start date and end date, based on the start date of the project, the end date of the project (due date), the relationship for the order of state-to-state constraints of each process, and a time required for each process.

Figure 17:
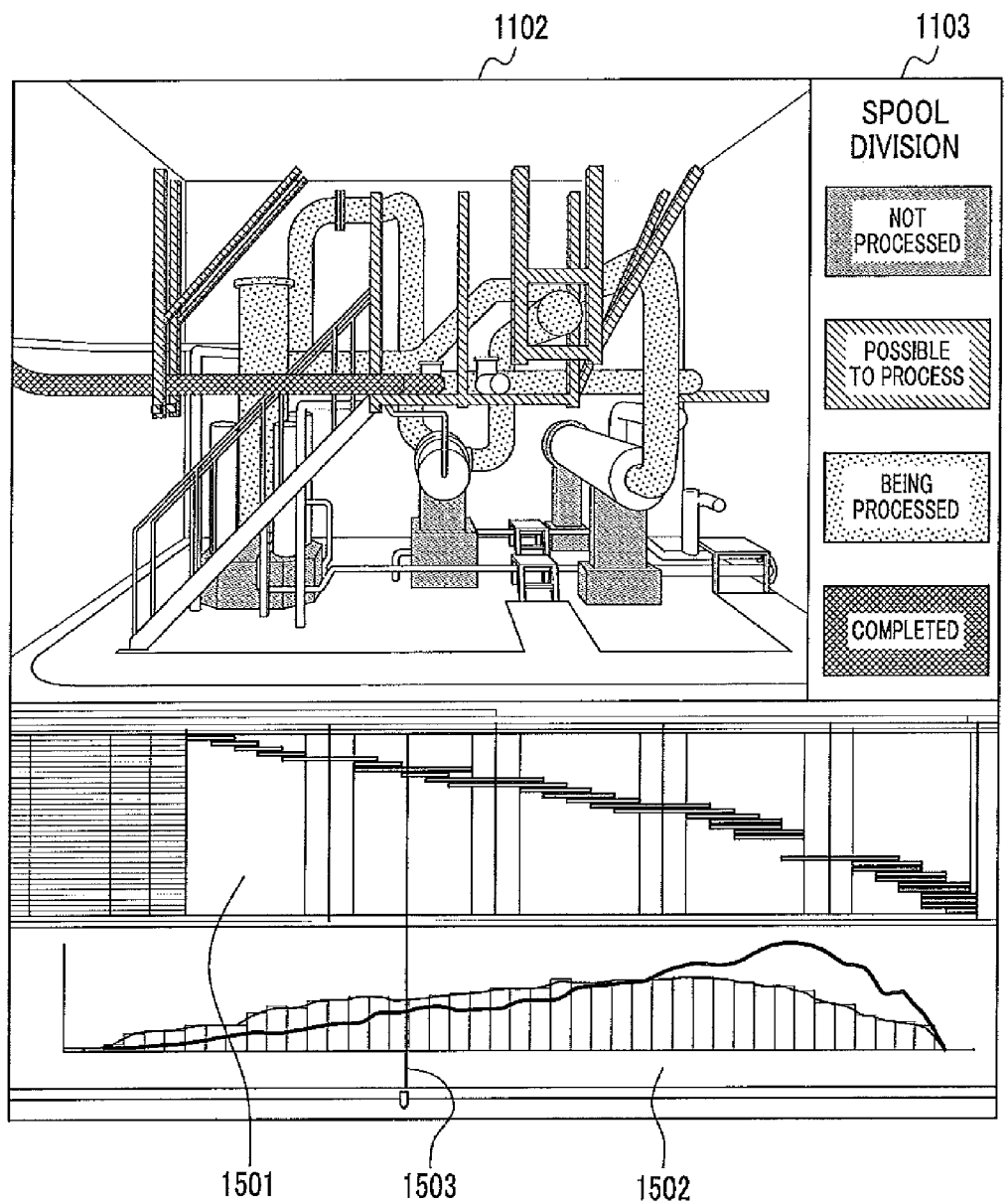
FIG. 17 is a drawing showing another example for the processing state display screen image of the present embodiment.

FIG. 17 is a drawing showing other examples of the screen for displaying a processing state according to the present embodiment.

The processing state display screen image shown in FIG. 17 includes a process table display screen image 1501 and a working condition graph display screen image 1502 as well as the design data display screen image 1102 and the example display screen image 1103 shown in FIG. 13. The horizontal axis of the process table display screen image 1501 or the working condition graph display screen image 1502 corresponds to time. The vertical axis of the working condition graph display screen 1502 corresponds to the number of workers and the working materials. Namely, the working condition graph display screen 1502 indicates a change of the number of workers or the working materials in association with a change of time. For example, the process table display screen image 1501 is displayed (refer to FIG. 1) on the output 109 based on the scheduling plan data shown in FIG. 16, through the design data state corresponding unit 105.

In FIG. 17, the state property at the time indicated by a bar 1503 is shown on the design data displaying screen 1102. If the bar is moved, the state property at the time is displayed on the design data displaying a screen image 1102.

As mentioned above, the design data displaying a screen image 1102 is displayed in association with the data on the processing table showing a result conducted by a scheduling plan at an optional stage in the project and the number of workers. In this way, by optionally specifying the time point on the time axis and the part in the design data 101, the state of the design data 101 on the specified time point is easily recognized visually. Further, according to the processing state display screen shown in FIG. 17, the state of the plan and result before the present time can be confirmed by optionally changing the time for displaying the design data 101 (the time indicated by the bar 1503). With respect to the state after the present time, the state of the plan can be confirmed.

Figure 18:
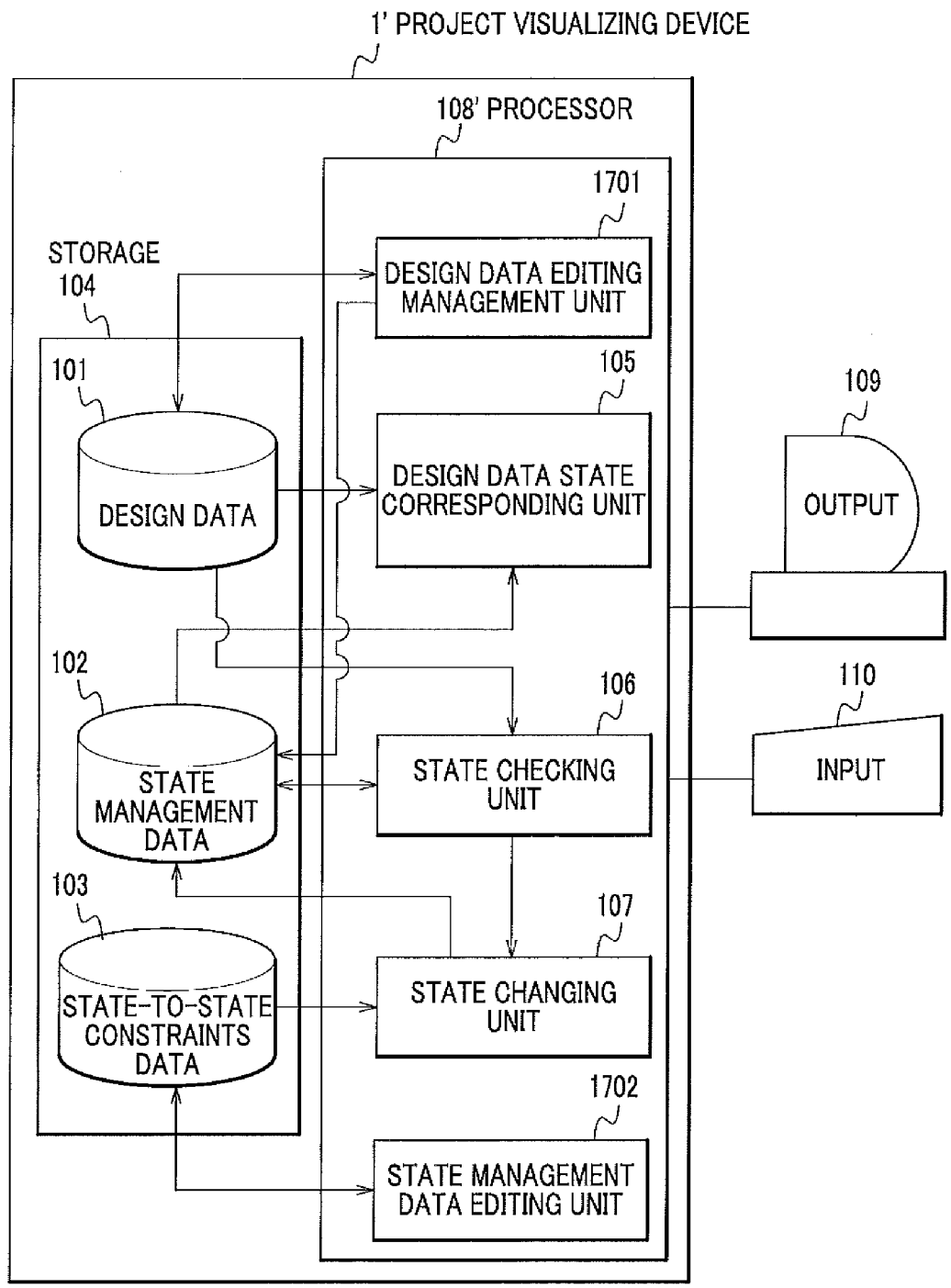
FIG. 18 is a schematic diagram showing another example of the project visualizing device of the present embodiment.

FIG. 18 is a schematic diagram showing another example for the project visualizing device 1' according to the present embodiment.

In FIG. 18, the same units as shown in FIG. 1 will not be explained. These units have the same codes as in FIG. 1.

The project visualizing device 1' in FIG. 18 is a device which contains processor 108' including a design data editing management unit 1701 and a state management data editing unit 1702 in addition to the structure of the project visualizing device 1 in FIG. 1.

The design data editing management unit 1701 observes the design data 101. If a change in the design data is detected, the design data editing management unit 1701 extracts the changed model ID and the position name of the changed model from the design property data. Then, the design data editing management unit 1701 changes the information corresponding to the model ID in the state management data 102. Here, the change includes an alternation, addition, deletion of a model ID. When a model ID is added, it is needed for a user to input a state property in the state management data 102 by using the input.

Hereby, it is possible to flexibly correspond to the change in the design data.

The state management data editing unit 1702 edits the constraints table based on the information supplied by the input. The definite method will be explained later with reference to FIG. 19.

Figure 19:
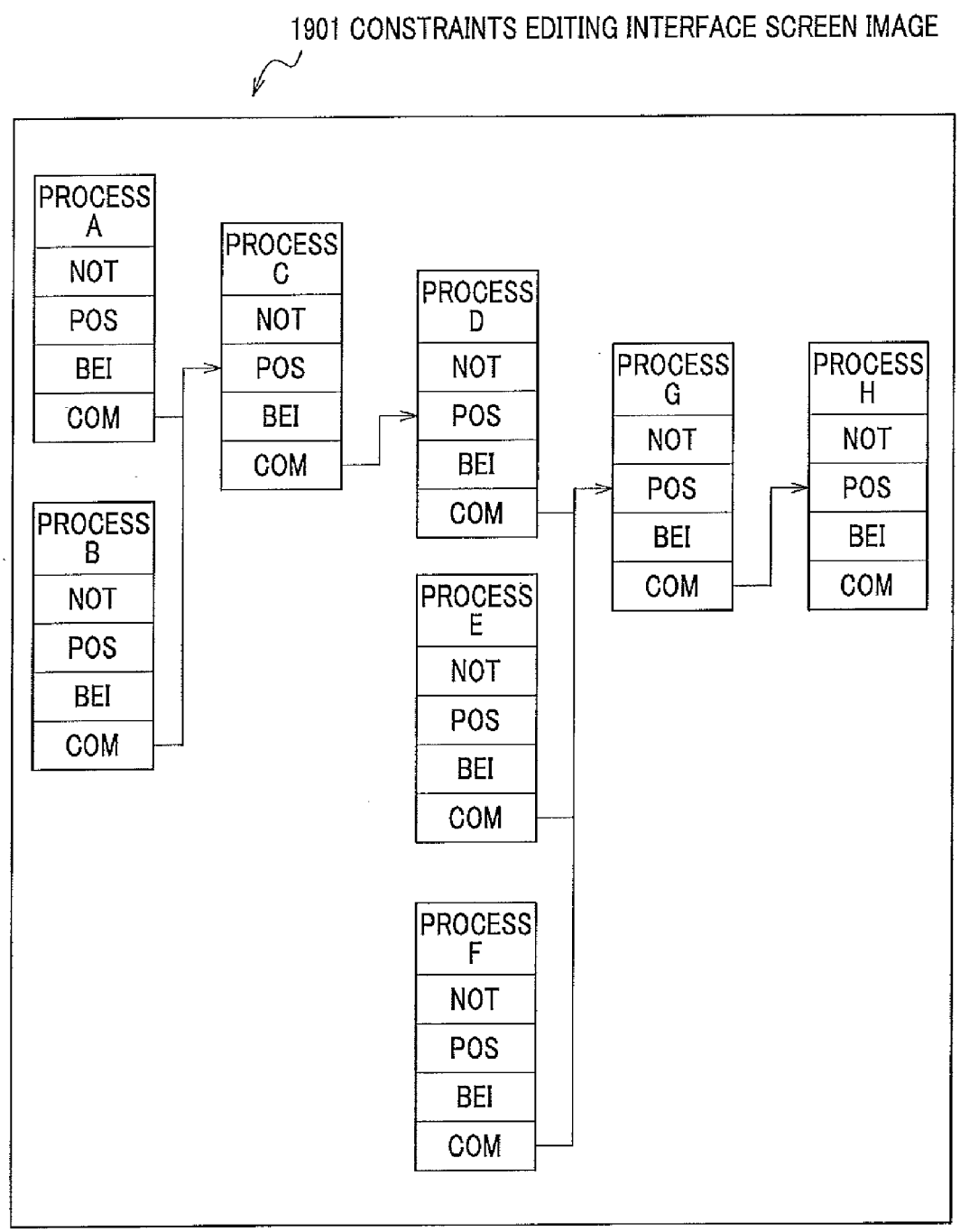
FIG. 19 is a drawing showing an example of a constraints editing interface screen image of the present embodiment.

FIG. 19 is a schematic diagram showing a constraints editing interface according to the present embodiment.

As shown in FIG. 19, on the screen of the output device 109 (refer to FIG. 1), the state management data editing unit 1702 stores data on the order of current processes in the state-to-state constraints data 103 (refer to FIG. 4), by connecting the state properties of the processes with an arrow using the input device 110 (refer to FIG. 1). In FIG. 19, "not" represents "not processed", "pos" represents "possible to process", "bei" represents "being processed", and "com" represents "completed". Here, each constraint can be represented by a numeral corresponding to the constraints in the state-to-state constraints data 103, for example, not processed: "0", possible to process: "1", being processed: "2", and completed: "3".

Hereby, it is possible to flexibly manage the data on the state-to-state constraints data 103.

Figure 20:
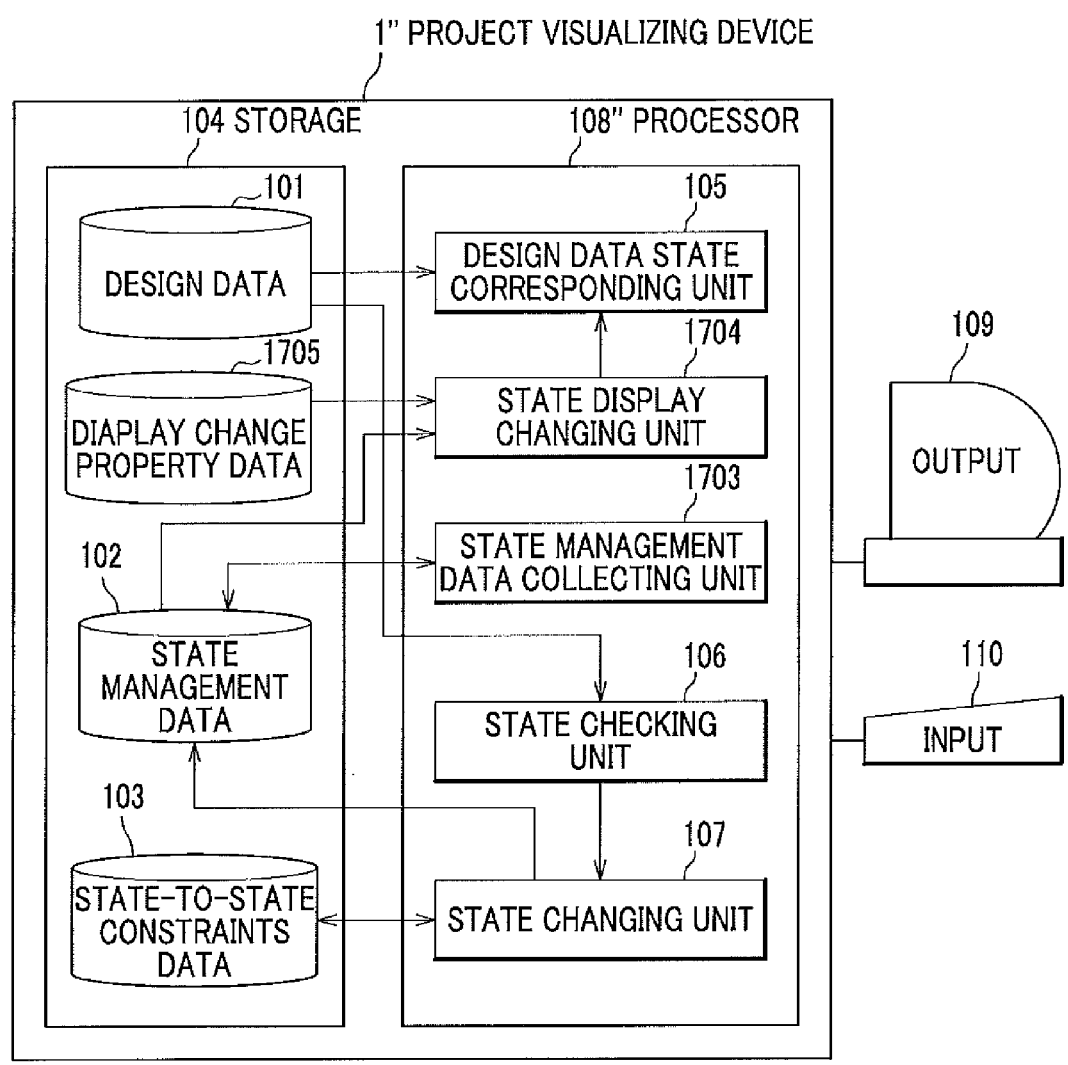
FIG. 20 is a schematic diagram showing another example of the project visualizing device of the present embodiment.

FIG. 20 is a schematic diagram showing another example of the project visualizing device 1" according to the present embodiment.

Here, with respect to FIG. 20, explanation for the units having the same codes as FIG. 1 is not given. A project visualizing device 1" in FIG. 20 is a device which contains a processor 108" including a state management data collecting unit 1703 and a state display changing unit 1704, and display change property data 1705 in addition to the structure of the project visualizing device 1 shown in FIG. 1. A respective component will be explained below.

Figure 21:
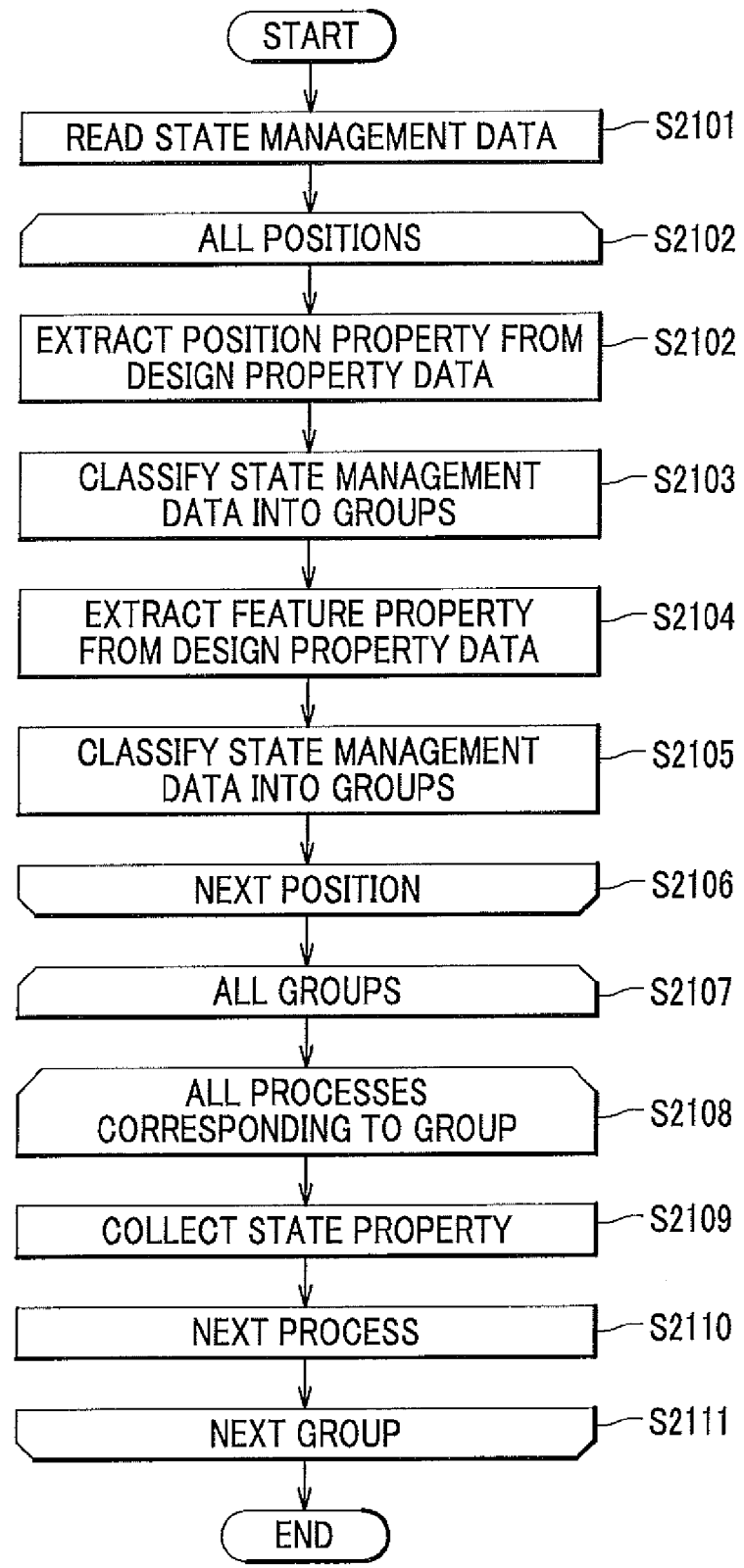
FIG. 21 is a flowchart showing collecting processing of the state management data collecting unit in FIG. 20.

FIG. 21 is a flowchart showing the collecting processing of the state management data collecting unit 1703. Firstly, the state management data collecting unit 1703 reads the state management data 102 from the storage 104 (S2101).

Then, the state management data collecting unit 1703 retrieves the design property data 202 by using a position name of the state management data 102 as a retrieving key. Next, the state management data collecting unit 1703 extracts a design property such as a floor and an area indicating a position where components are installed (S2102).

Here, FIG. 22 indicates an exemplary table of the design property data 202 which are read by the state management data collecting unit 1703. FIG. 22 is an example of the design property data indicating a position name and installation position which are associated with each other. Here, the table of FIG. 22 is constructed by adding the position name and the installation position to the design property data in FIG. 2B. On the other hand, it is possible to make the table of FIG. 22 another for managing the position name in association with the installation position, besides the design property data shown in FIG. 2B. The exemplary table in FIG. 22 includes a floor and an area as a product property.

The state management data collecting unit 1703 classifies the state management data 102 into a group of respective design properties which are extracted by the state management data collecting unit 1703. The state management data collecting unit 1703 newly adds a group ID as a model ID of the state management data (S2103). For example, if the state management data collecting unit 1703 selects an area among component properties, the state management data collecting unit 1703 prepares a group of components for each area A, area B, area C and area D, and assigns a group ID to each group. FIG. 23 shows an example in which the group ID is added to the state management data. For example, G0001 of the model ID of the position ID is assigned to the product group in the area A.

Herein, a group according to the design property indicating a position of the design target object is called a position group. The state management data collecting unit 1703 further extracts such a design property as a type or a shape of the target part for each of the position groups (S2104).

The state management data collecting unit 1703 collects the state management data 102 for each of the extraction design properties into a group to which a group ID is assigned, and adds each group of the collected state management data to the state management data (S2105). Here, a group classified according to the design property indicating a type of the design target object is called a type group.

Similarly to the position group and type group as mentioned above, a classified group according to a feature of the design target object is added to the state management data as a feature group. The feature groups are component group data classified into a plurality of groups according to the property indicating a feature among the design data. Similarly to the grouping by the installation position in S2103 and the grouping by the design property such as a type or a shape in S2104, a further grouping for components within an already divided group is possible by focusing on other features. The grouping method composed of multiple steps comprises, selecting a plurality of features on properties of components, grouping components each having a plurality of properties, and associating a group with a higher-level group having one of the features among a plurality of properties. By the above mentioned method, a multiple steps grouping is possibly performed. Further, a grouping by the position group in S2103 is possible without performing the steps S2104 and S2105.

The state management data collecting unit 1703 collects the state property 301 of the components in the group in all the processes corresponding to the respective group (S2108) in one or all of the groups among the position groups and type groups (S2107). Then, the state management data collecting unit 1703 stores the collected state properties into the state management data in the storage 104 (S2109). For example, if all process state properties in a process on all components are completed, the process state property within the groups becomes "com". Further, if some process state properties in a process on all components in a group are a state property of "being processed" or "not processed", the process state property within the group becomes "bei". Further, a ratio of the numbers of the sate property of "com" may be represented by a percentage value of progress (numeral in FIG. 23). For example, if G0002 of a model ID is assigned to a group of pipes (L0005, L0006) in the area C which is grouped in FIG. 22, the process state property of the process D is represented by "bei" because some process state properties are a state property of "being progressed". Or, "50%" is input according to the ratio of the number of components with the state of "com" per the total number of components. The mean value is used to calculate the progress of the group. Alternatively, calculation after assigning a weight to each component may be used. If there is a change of a history property for components of a group, the state management data collecting unit 1703 updates the history change property of the group in the state management data. The state checking unit 106 checks the state management data of FIG. 23 in all the features and all the processes in the position group or the type group in the state management data. The design property data 202 has a design property related to a worker such as a department in charge of a design target object and a working trader. Further, the design property data 202 collects the states every working group and may check the state management data.

Hereby, it is possible to swiftly start working in a process in which the respective work is conducted for the respective component group because information on a change in the progress state of the respective component group as well as the component is shared among the processes.

Next, a method for displaying a working progress in combination with a layout of the target component 2201 will be explained with reference to FIG. 24.

Figure 24:
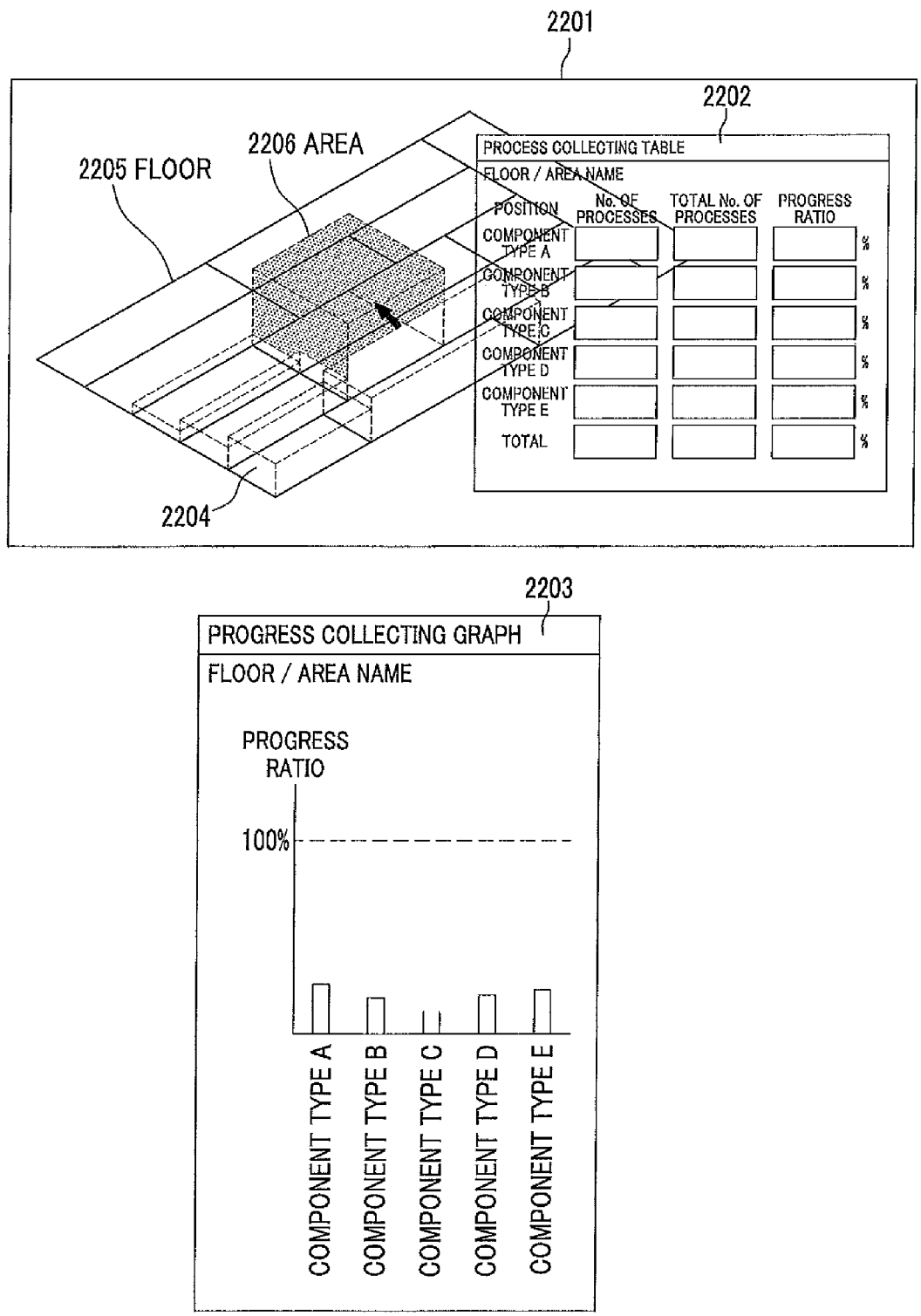
FIG. 24 shows another example of the processing state display image of the present embodiment.

FIG. 24 is an exemplary drawing showing the progress status display screen image according to the present embodiment. As an example for the progress status display screen displayed by the design data state corresponding unit 105, is indicated a progress collecting table 2202, a progress collecting graph 2203, and a CAD layout 2204. Here, one of the tables is displayed for grasping the processing state performed by each group. Each of the progress collecting table 2202, progress collecting graph 2203, and CAD layout 2204 indicates the progress state data on the process for each component. The progress collecting table 2202 groups progresses, for example, by a respective component type as a feature of a design target, and displays a progress ratio of a process for the respective group. The progress ratio is provided by a ratio calculated by dividing the number of completed working processes for each group by the number of total working processes. It is also suitable to display the number of completed working processes for each group and number of total working processes in the table. Further, it is possible to display a group of a floor or an area on the display. The progress collecting graph 2203 displays the progress collecting table as a graph. The CAD layout 2204 is a layout displaying a position of a component group. If a position is selected as a component property, data on a shape and a position of the component is stored in the design data. Here, CAD data on the component group is provided for each area, and the data is displayed as the CAD layout 2204. With respect to the CAD layout 2204, an example indicating a position of the component group as well as a progress status of the component group will be explained. For example, the CAD layout 2204 is displayed on a three dimensional CAD. Herein, is displayed a three dimensional graph in which a variable of a horizontal axis represents outline configuration of the area 2206 on the floor 2205 in the CAD layout, and a variable of a vertical axis is represented by a progress ratio.

As mentioned above, the design data state corresponding unit 105 performs the operation according to the following steps. The design data state corresponding unit 105 creates the data on a component group from the design data. The data on a component group is classified into a plurality of groups according to a property representing a feature. Then, the design data state corresponding unit 105 collects the data for processing state properties of processes for each component group to which a component group ID is assigned. Next, the design data state corresponding unit 105 generates the processing state display screen for indicating the progress status data of the processes with respect to the collected component group data, and displays on the display. Hereby, it is possible to visually grasp the progress on the work of the component groups classified by a feature of component properties into a plurality of groups, by referring to the screen image displayed.

The design data state corresponding unit 105 displays the CAD layout 2204 which indicates a position of the target component group for the design data 101, and a value of a progress ratio of a state property in the state management data 102, in association with the progress collecting table 2202 or the progress collecting graph 2203. Further, the collecting table and graph are displayed on another by marking and highlighting positions of the target groups so that the correspondence of the positions is prominent in the layout.

Further, if an area 2206 where the CAD layout 2204 exists is selected, the design data state responding unit 105 displays the progress ratio for each type of other properties in the progress collecting table 2202 in association with the area 2206. The CAD layout 2204 is grouped according to an area among component properties. The progress collecting table 2202 is grouped according to an area and type properties among component properties. Hereby, the layout indicating an arrangement position of which information is included in the data on component group is displayed on the display. The progress status data on progress with respect to the data on a component group is grouped based on a feature of other properties besides the property of the groups in the layout. Therefore, influences of a specific component group on other component groups are confirmed with a relation of the arrangement positions, by displaying the layout on the display. The present invention is not restricted to the above mentioned example. It is also appropriate that a floor is selected as a property of the CAD layout, and a floor and area are selected as properties of the progress collecting table.

Next, a method for changing a display for a progress status of operations will be explained.

The state display changing unit 1704 in FIG. 20 observes a state property of an optional process corresponding to a model ID and a group ID in the state management data 102. Further, the state display changing unit 1704 reads a property of a display change in the display change property data 1705. Then, the state display changing unit 1704 informs the design data state corresponding unit 105 of a change of the processing state display screen image in association with the display change property. The design data state corresponding unit 105 displays either the processing state display screen image in FIG. 13 or the processing state display screen image in FIG. 24 on the output device 109 by changing the screen image. The display change property data is described by a rule style such as "when a state property of the process B in the "position group A" becomes "com", the state display changing unit 1704 changes a screen image for displaying a processing state C (FIG. 13) to a screen image for displaying a processing state D (FIG. 24)". It is suitable, for example, that a screen image in FIG. 13 is changed to a screen image in FIG. 24 by pressing a button for changing a screen image through the input device 110, so as to change the process display screen image.

Hereby, either the processing state displaying both progress state data on each component group data as shown in FIG. 24 and a layout indicating an arrangement position of component group data, or a processing state displaying both progress status data and a layout on a plurality of components, is displayed by changing the screen image according to the state property of the state management data. Through the procedure of changing the screen image, it is possible to confirm the relationship between a component group and a component by a relationship among arrangement positions. For example, if a process on a component is not completed and this influences a progress state of total processes, the influence of the component group can be confirmed by a relationship among group arrangement positions.

In the above-mentioned embodiment, it is described that the component group data which is classified into a plurality of groups according to the property representing one feature of the design data is created, and that the progress status data on processes every component group data with the component group ID is collected. Herein, it is also suitable to create the data beforehand by consigning the data construction to an outside business partner. Hereby, if classification and collection processing is executed beforehand by the outside business partner, a manager for managing progress status of processes only conducts an operation to display the collecting results by the management device. The progress status management device stores the component group data which is grouped into a plurality of groups according to a property showing a feature of the design data in the storage. If the progress status management device is instructed to display the plurality of groups, the progress status management device displays the progress status data on processes relevant to the component group data. Then, by displaying the layout of the component group data, the progress status of the groups is easily grasped with the layout of the product components.

Each of the units 105 to 107, 1701 to 1704 included in the processors 108, 108' and 108" in FIG. 1, FIG. 18 and FIG. 20, are realized by programs stored in an HD (Hard Disk) not shown which are expanded in a RAM (Random Access Memory) not shown and executed by a CPU (Central Processing Unit) not shown.

According to the present embodiments, it is possible to visually confirm the progress status of a plant EPC project. Particularly, it is possible for a manager and a person in charge to visually confirm how going a progress status is of a specific target (a model). Accordingly, it is possible to provide a system for preventing a delay of the project progress.

Further, according to the present embodiment, since the progress status is visually confirmed and this makes workers in a department or among departments be capable of communicating the progress status information on the project, it is possible to prevent the delay of the project progress.

Further, since progress status of a group of targets (models) can be visually confirmed as a collected form, it is possible to efficiently grasp processing states of a large-scaled project.

Here, in processes of an actual project, it is not necessary to complete all the processes at a preceding stage to a target stage. In other words, if a preceding process having constraints is completed, it is possible to start following processes to the preceding process. According to the present embodiment, since it is possible to visually grasp progress status having constraints, progress status of processes is possibly to grasp. Accordingly, since a possibility for a delay of a total project can be reduced, it is possible to prevent an actual delay of the total project progress.

Herein, the present embodiment is not restricted to a plant project. By using digital mockup data, it is possible to visually grasp progress status and data for managers and persons in charge of a product development project performing a three dimensional design such as an industrial product, urban development and building. The present embodiment is widely applicable to prevention of a delay and the like.

What is claimed is:

1. A progress status management method for a progress status management device to manage a progress status of a process,
the progress status management method comprising,
associating component data stored in design data in a storage with data on a progress status stored in state management data according to a component ID,
further associating display method data stored in display property data with data on progress status of a process corresponding to a component data,
preparing a processing state display screen image for displaying a correspondence of the data,
displaying the processing state display screen image on a display, the image including a layout, a progress collecting graph and a progress collecting table, each of the layout, the graph and the table indicating progress status data, and each of the graph and the table indicating the progress status data for a plurality of groups,
further displaying the progress status data on a process of component group data, if the progress status management device is instructed to display a plurality of groups, and
displaying the layout of the component group data as a three dimensional graph in which a variable of a horizontal axis represents outline configuration of an area on a floor, and a variable of a vertical axis is represented by a progress ratio, allowing the progress status to be visually confirmed as a prominence in the layout including the area on the floor in a large scale, wherein
the layout of which information is included in component group data as a group property of the layout,
the progress status data on the process of component group data is grouped by a feature of another property besides the group property of the layout, and is displayed on the display, and
the progress ratio is provided by a ratio calculated by dividing the number of completed working processes for each group by the number of total working processes.

2. The progress status management method according to claim 1, in which the progress status management device further stores state-to-state constraints data which describes a preceding and following relation among processes,
the progress status management method comprising,
referring to the state-to-state constraints data if the progress status data on the processes in the state management data changes,
retrieving all the processes which include preceding processes and following processes to the process in which the processing state changes, and updating the processing state data on the process to "completed", when the preceding process to the retrieved process is entirely completed.

3. The progress status management method according to claim 2, wherein a change in the progress status data on the process in the state management data is detected by the progress status management device through referring to a state management table every predetermined period.

4. The progress status management method according to claim 2, wherein the progress status management device edits the state-to-state constraints data through an input.

5. The progress status management method according to claim 1, wherein the progress status management device extracts the component ID corresponding to the change in the design data through the input when the design data is changed.

6. The progress status management method according to claim 1, wherein the storage stores a scheduling plan data corresponding to a process, the data including the number of workers, and the progress status management device displays a processing plan screen image according to the scheduling plan data together with the processing state display screen image.

7. A progress state management device which manages a progress status of a process comprising:
a storage which stores,
design data in which a component ID is assigned to respective component data,
state management data which associates the component ID with progress status data on a plurality of processes,
display property data storing display method data including information on a displaying method for discriminating progress status of the processes, and
progress status data on a process of component group data, in the case of the progress status management device being instructed to display a plurality of groups, thereby to display a layout of the component group data,
a processor which associates component data stored in the design data in the storage with processing state data stored in the state management data, further associates the display method data stored in the display property data with the progress status data on the process corresponding to the component data, and displays the processing state display screen image displaying a layout, a progress collecting graph and a progress collecting table, each of the layout, the graph and the table indicating the progress status data, and each of the graph and the table indicating the progress status data for a plurality of groups, wherein
the layout of the component group data is displayed as a three dimensional graph in which a variable of a horizontal axis represents outline configuration of an area on a floor and a variable of a vertical axis is represented by a progress ratio, allowing the progress status to be visually confirmed as a prominence in the layout including the area on the floor in a large scale,
the layout of which information is included in component group data as a group property of the layout,
the progress status data on the process of the component group data is grouped by a feature of another property besides the group property of the layout, and is displayed on the display, and the progress ratio is provided by a ratio calculated by dividing the number of completed working processes for each group by the number of total working processes.

8. A progress status management method for a progress status management device to manage a progress status of a process, the progress status management method comprising, creating component group data which is classified into a plurality of groups according to a property representing one feature of design data in which a component ID is assigned to respective component data, collecting progress status data on the process of every component group data assigned the component group ID, preparing process state display screen image displaying the progress status data on the process related to the collected component group data, the image including a layout, a progress collecting graph and a progress collecting table, and each of the layout, the graph and the table indicating the progress status data, and each of the graph and the table indicating the progress status data for a plurality of groups, and displaying on a display, further displaying the progress status data on a process of component group data, if the progress status management device is instructed to display a plurality of groups, and displaying the layout of the component group data as a three dimensional graph in which a variable of a horizontal axis represents outline configuration of an area on a floor and a variable of a vertical axis is represented by a progress ratio, allowing the progress status to be visually confirmed as a prominence in the layout including the area on the floor in a large scale, wherein the layout of which information is included in component group data as a group property of the layout, the progress status data on the process of the component group data is grouped by a feature of another property besides the group property of the layout, and is displayed on the display, and the progress ratio is provided by a ratio calculated by dividing the number of completed working processes for each group by the number of total working processes.

9. The progress status management method according to claim 8, wherein the progress status management device prepares the processing state display screen image, by associating the progress status data on the process in the component group data with a layout indicating an arrangement position of the component group data.

10. The progress status management method according to claim 9, wherein the progress status management device displays either the processing state display screen image or a progress status display screen image which displays a layout of a plurality of components and progress status data on a plurality of components, by changing the screen image in association with the state property in the state management data.

11. The progress status management method according to claim 8, comprising, displaying a layout indicating an arrangement position of the component group data on the display, grouping processing state data on a process of the component group data, according to a feature of another property besides a group property of the layout, and displaying on the display.

12. A progress status management device which manages a progress status of a process comprising:

design data in which a component ID is assigned to respective component data, a storage for storing state management data which associates the component ID with progress status data on a plurality of processes, and progress status data on a process of component group data, in the case the progress status management device being instructed to display a plurality of groups, thereby to display a layout of the component group data, a collecting unit which creates component group data classified to a plurality of groups by a property representing one feature of the design data, and collects progress status data on the processes for each of the component group data to which a component group ID is assigned, and a processor for displaying a processing state display screen image which displays progress status data on a process for each of the collected component group data via a layout, a progress collecting graph and a progress collecting table, and each of the graph and the table indicating progress status data for a plurality of groups, wherein the layout of the component group data is displayed as a three dimensional graph in which a variable of a horizontal axis represents outline configuration of an area on a floor and a variable of a vertical axis is represented by a progress ratio, allowing the progress status to be visually confirmed as a prominence in the layout including the area on the floor in a large scale, the layout of which information is included in component group data as a group property of the layout, the progress status data on the process of the component group data is grouped by a feature of another property besides the group property of the layout, and is displayed on the display, and the progress ratio is provided by a ratio calculated by dividing the number of completed working processes for each group by the number of total working processes.

* * * * *